United States Patent
Brooks et al.

(10) Patent No.: US 10,448,117 B2
(45) Date of Patent: *Oct. 15, 2019

(54) APPARATUS AND METHODS FOR PACKETIZED CONTENT DELIVERY OVER A BANDWIDTH-EFFICIENT NETWORK

(71) Applicant: Time Warner Cable Enterprises LLC, St. Louis, MO (US)

(72) Inventors: Paul D. Brooks, Weddington, NC (US); Tom Gonder, Broomfield, CO (US); Glen Hardin, Charlotte, NC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,343

(22) Filed: Apr. 30, 2018

(65) Prior Publication Data

US 2018/0316979 A1    Nov. 1, 2018

Related U.S. Application Data

(60) Continuation of application No. 14/663,223, filed on Mar. 19, 2015, now Pat. No. 9,961,413, which is a (Continued)

(51) Int. Cl.
*H04N 21/643* (2011.01)
*H04N 21/222* (2011.01)
(Continued)

(52) U.S. Cl.
CPC ..... *H04N 21/64322* (2013.01); *H04N 21/222* (2013.01); *H04N 21/2221* (2013.01);
(Continued)

(58) Field of Classification Search
None
See application file for complete search history.

(56) References Cited

U.S. PATENT DOCUMENTS

| 5,226,901 A | 7/1993 | Dhaliwal et al. |
| 5,410,344 A | 4/1995 | Graves et al. |

(Continued)

FOREIGN PATENT DOCUMENTS

| JP | 2005519365 A | 6/2005 |
| JP | 2005519501 A | 6/2005 |

(Continued)

OTHER PUBLICATIONS

Cantor, et al., Assertions and Protocols for the Oasis Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

(Continued)

*Primary Examiner* — Cai Y Chen
(74) *Attorney, Agent, or Firm* — Gadzinski & Associates, PC

(57) ABSTRACT

Methods and apparatus for providing packetized content to users via a bandwidth-optimized network. In one embodiment, legacy and IPTV streams are carried over the same switched digital infrastructure, and freely intermixed without regard to their encoding or type. A user's selection for IPTV content is transmitted to an IP proxy (such as a gateway apparatus or a headend server), then on to the switched digital server which causes provision of the requested content back to the proxy for formatting. The formatted content is then delivered to the requesting IP-capable device. The entire carrier class program stream is therefore available as IP-encapsulated content to the IP capable devices (and as legacy content to legacy devices) without any significant modifications to the network infrastructure or bandwidth penalty.

20 Claims, 15 Drawing Sheets

Related U.S. Application Data division of application No. 12/841,906, filed on Jul. 22, 2010, now Pat. No. 8,997,136.

(51) Int. Cl.
| | |
|---|---|
| *H04N 21/236* | (2011.01) |
| *H04N 21/61* | (2011.01) |
| *H04N 21/2381* | (2011.01) |
| *H04N 21/2385* | (2011.01) |
| *H04N 21/239* | (2011.01) |
| *H04N 21/258* | (2011.01) |
| *H04N 21/6405* | (2011.01) |

(52) U.S. Cl.
CPC ..... *H04N 21/2381* (2013.01); *H04N 21/2385* (2013.01); *H04N 21/2393* (2013.01); *H04N 21/23608* (2013.01); *H04N 21/25816* (2013.01); *H04N 21/6125* (2013.01); *H04N 21/6405* (2013.01)

(56) References Cited

U.S. PATENT DOCUMENTS

| | | | |
|---|---|---|---|
| 5,528,284 | A | 6/1996 | Iwami et al. |
| 5,534,911 | A | 7/1996 | Levitan |
| 5,557,319 | A | 9/1996 | Gurusami et al. |
| 5,599,312 | A | 2/1997 | Higashikawa |
| 5,708,961 | A | 1/1998 | Hylton et al. |
| 5,745,837 | A | 4/1998 | Fuhrmann |
| 5,758,257 | A | 5/1998 | Herz et al. |
| 5,818,438 | A | 10/1998 | Howe et al. |
| 5,822,530 | A | 10/1998 | Brown |
| 5,838,921 | A | 11/1998 | Speeter |
| 5,844,552 | A | 12/1998 | Gaughan et al. |
| 5,897,635 | A | 4/1999 | Torres et al. |
| 5,940,738 | A | 8/1999 | Rao |
| 5,999,535 | A | 12/1999 | Wang et al. |
| 6,118,472 | A | 9/2000 | Dureau et al. |
| 6,125,397 | A | 9/2000 | Yoshimura et al. |
| 6,167,432 | A | 12/2000 | Jiang |
| 6,181,697 | B1 | 1/2001 | Nurenberg et al. |
| 6,219,710 | B1 | 4/2001 | Gray et al. |
| 6,233,389 | B1 | 5/2001 | Barton et al. |
| 6,259,701 | B1 | 7/2001 | Shur et al. |
| 6,317,884 | B1 | 11/2001 | Eames et al. |
| 6,345,038 | B1 | 2/2002 | Selinger |
| 6,389,538 | B1 | 5/2002 | Gruse et al. |
| 6,396,531 | B1 | 5/2002 | Gerszberg et al. |
| 6,432,401 | B2 | 8/2002 | Weber et al. |
| 6,437,401 | B1 | 8/2002 | Mandelman et al. |
| 6,473,793 | B1 | 10/2002 | Dillon et al. |
| 6,519,062 | B1 | 2/2003 | Yoo |
| 6,523,696 | B1 | 2/2003 | Saito et al. |
| 6,546,016 | B1 | 4/2003 | Gerszberg et al. |
| 6,564,381 | B1 | 5/2003 | Hodge et al. |
| 6,640,145 | B2 | 10/2003 | Hoffberg et al. |
| 6,642,938 | B1 | 11/2003 | Gilboy |
| 6,642,939 | B1 | 11/2003 | Vallone et al. |
| 6,643,262 | B1 | 11/2003 | Larsson et al. |
| 6,692,468 | B1 | 2/2004 | Waldenburg |
| 6,694,145 | B2 | 2/2004 | Riikonen et al. |
| 6,711,742 | B1 | 3/2004 | Kishi et al. |
| 6,718,552 | B1 | 4/2004 | Goode |
| 6,721,789 | B1 | 4/2004 | Demoney |
| 6,748,395 | B1 | 6/2004 | Picker et al. |
| 6,754,904 | B1 | 6/2004 | Cooper et al. |
| 6,757,906 | B1 | 6/2004 | Look et al. |
| 6,774,926 | B1 | 8/2004 | Ellis et al. |
| 6,788,676 | B1 | 9/2004 | Partanen et al. |
| 6,817,987 | B2 | 11/2004 | Vetter et al. |
| 6,847,778 | B1 | 1/2005 | Vallone et al. |
| 6,909,726 | B1 | 6/2005 | Sheeran |
| 6,918,131 | B1 | 7/2005 | Rautila et al. |
| 6,925,257 | B2 | 8/2005 | Yoo |
| 6,931,018 | B1 | 8/2005 | Fisher |
| 6,934,964 | B1 | 8/2005 | Schaffer et al. |
| 6,944,150 | B1 | 9/2005 | McConnell et al. |
| 6,978,474 | B1 | 12/2005 | Sheppard et al. |
| 6,981,045 | B1 | 12/2005 | Brooks |
| 7,006,881 | B1 | 2/2006 | Hoffberg et al. |
| 7,009,972 | B2 | 3/2006 | Maher et al. |
| 7,013,290 | B2 | 3/2006 | Ananian |
| 7,020,652 | B2 | 3/2006 | Matz et al. |
| 7,027,460 | B2 | 4/2006 | Iyer et al. |
| 7,039,048 | B1 | 5/2006 | Monta et al. |
| 7,051,352 | B1 | 5/2006 | Schaffer |
| 7,054,902 | B2 | 5/2006 | Toporek et al. |
| 7,055,031 | B2 | 5/2006 | Platt |
| 7,055,165 | B2 | 5/2006 | Connelly |
| 7,068,639 | B1 | 6/2006 | Varma et al. |
| 7,096,483 | B2 | 8/2006 | Johnson |
| 7,099,308 | B2 | 8/2006 | Merrill et al. |
| 7,100,183 | B2 | 8/2006 | Kunkel et al. |
| 7,103,905 | B2 | 9/2006 | Novak |
| 7,106,382 | B2 | 9/2006 | Shiotsu |
| 7,146,627 | B1 | 12/2006 | Ismail et al. |
| 7,149,772 | B1 | 12/2006 | Kalavade |
| 7,167,895 | B1 | 1/2007 | Connelly |
| 7,174,126 | B2 | 2/2007 | McElhatten et al. |
| 7,174,127 | B2 | 2/2007 | Otten et al. |
| 7,174,385 | B2 | 2/2007 | Li |
| 7,185,355 | B1 | 2/2007 | Ellis et al. |
| 7,206,775 | B2 | 4/2007 | Kaiser et al. |
| 7,207,055 | B1 | 4/2007 | Hendricks et al. |
| 7,209,458 | B2 | 4/2007 | Ahvonen et al. |
| 7,213,036 | B2 | 5/2007 | Apparao et al. |
| 7,228,556 | B2 | 6/2007 | Beach et al. |
| 7,242,960 | B2 | 7/2007 | Van Rooyen et al. |
| 7,254,608 | B2 | 8/2007 | Yeager et al. |
| 7,257,106 | B2 | 8/2007 | Chen et al. |
| 7,260,823 | B2 | 8/2007 | Schlack et al. |
| 7,293,276 | B2 | 11/2007 | Phillips et al. |
| 7,293,776 | B2 | 11/2007 | Fenwick |
| 7,311,391 | B2 | 12/2007 | Ogawa et al. |
| 7,312,391 | B2 | 12/2007 | Kaiser et al. |
| 7,325,043 | B1 | 1/2008 | Rosenberg et al. |
| 7,325,073 | B2 | 1/2008 | Shao et al. |
| 7,330,483 | B1 | 2/2008 | Peters, Jr. et al. |
| 7,333,483 | B2 | 2/2008 | Zhao et al. |
| 7,336,787 | B2 | 2/2008 | Unger et al. |
| 7,337,458 | B2 | 2/2008 | Michelitsch et al. |
| 7,340,759 | B1 | 3/2008 | Rodriguez |
| 7,340,762 | B2 | 3/2008 | Kim |
| 7,359,375 | B2 | 4/2008 | Lipsanen et al. |
| 7,363,643 | B2 | 4/2008 | Drake et al. |
| 7,376,386 | B2 | 5/2008 | Phillips et al. |
| 7,382,786 | B2 | 6/2008 | Chen et al. |
| 7,457,520 | B2 | 11/2008 | Rossetti et al. |
| 7,486,869 | B2 | 2/2009 | Alexander et al. |
| 7,532,712 | B2 | 5/2009 | Gonder et al. |
| 7,548,562 | B2 | 6/2009 | Ward et al. |
| 7,567,983 | B2 | 7/2009 | Pickelsimer et al. |
| 7,571,452 | B2 | 8/2009 | Gutta |
| 7,592,912 | B2 | 9/2009 | Hasek et al. |
| 7,602,820 | B2 | 10/2009 | Helms et al. |
| 7,609,637 | B2 | 10/2009 | Doshi et al. |
| 7,624,337 | B2 | 11/2009 | Sull et al. |
| 7,690,020 | B2 | 3/2010 | Lebar |
| 7,693,171 | B2 | 4/2010 | Gould |
| 7,721,314 | B2 | 5/2010 | Sincaglia et al. |
| 7,742,074 | B2 | 6/2010 | Minatogawa |
| 7,763,360 | B2 | 7/2010 | Paul et al. |
| 7,787,539 | B2 | 8/2010 | Chen |
| 7,809,942 | B2 | 10/2010 | Baran et al. |
| 7,889,765 | B2 | 2/2011 | Brooks et al. |
| 7,900,052 | B2 | 3/2011 | Jonas et al. |
| 7,916,755 | B2 | 3/2011 | Hasek et al. |
| 7,924,451 | B2 | 4/2011 | Hirooka |
| 7,936,775 | B2 | 5/2011 | Iwamura |
| 7,954,131 | B2 | 5/2011 | Cholas et al. |
| 7,975,283 | B2 | 7/2011 | Bedingfield et al. |
| 8,015,306 | B2 | 9/2011 | Bowman |
| 8,032,914 | B2 | 10/2011 | Rodriguez |

(56) References Cited

U.S. PATENT DOCUMENTS

| | | |
|---|---|---|
| 8,046,836 B2 | 10/2011 | Isokawa |
| 8,056,103 B2 | 11/2011 | Candelore |
| 8,170,065 B2 | 5/2012 | Hasek et al. |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,429,702 B2 | 4/2013 | Yasrebi et al. |
| 8,516,529 B2 | 8/2013 | Lajoie et al. |
| 8,520,850 B2 | 8/2013 | Helms et al. |
| 8,677,431 B2 | 3/2014 | Smith |
| 8,713,623 B2 | 4/2014 | Brooks |
| 8,713,673 B2 | 4/2014 | Kitamura |
| 8,731,053 B2 | 5/2014 | Karegoudar |
| 9,167,410 B1 | 10/2015 | Xue et al. |
| 9,215,423 B2 | 12/2015 | Kimble et al. |
| 9,906,838 B2 | 2/2018 | Cronk et al. |
| 2001/0004768 A1 | 6/2001 | Hodge et al. |
| 2001/0050924 A1 | 12/2001 | Herrmann et al. |
| 2001/0050945 A1 | 12/2001 | Lindsey |
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow et al. |
| 2002/0100059 A1 | 7/2002 | Buehl et al. |
| 2002/0143607 A1 | 10/2002 | Connelly |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0157091 A1 | 10/2002 | Demello et al. |
| 2002/0188744 A1 | 12/2002 | Mani |
| 2002/0188869 A1 | 12/2002 | Patrick |
| 2003/0005453 A1 | 1/2003 | Rodriguez et al. |
| 2003/0028451 A1 | 2/2003 | Ananian |
| 2003/0046704 A1 | 3/2003 | Laksono et al. |
| 2003/0056217 A1 | 3/2003 | Brooks |
| 2003/0093794 A1 | 5/2003 | Thomas et al. |
| 2003/0115267 A1 | 6/2003 | Hinton et al. |
| 2003/0118014 A1 | 6/2003 | Iyer et al. |
| 2003/0135860 A1 | 7/2003 | Dureau |
| 2003/0163443 A1 | 8/2003 | Wang |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019913 A1 | 1/2004 | Wong et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0117254 A1 | 6/2004 | Nemirofsky et al. |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0002418 A1 | 1/2005 | Yang et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0289618 A1 | 12/2005 | Hardin |
| 2006/0001741 A1* | 1/2006 | Hsu .............. G08B 13/196 348/143 |
| 2006/0020786 A1 | 1/2006 | Helms et al. |
| 2006/0021004 A1 | 1/2006 | Moran et al. |
| 2006/0041915 A1 | 2/2006 | Dimitrova et al. |
| 2006/0047957 A1 | 3/2006 | Helms et al. |
| 2006/0095940 A1 | 5/2006 | Yearwood |
| 2006/0104968 A1 | 5/2006 | Bookbinder et al. |
| 2006/0117379 A1 | 6/2006 | Bennett et al. |
| 2006/0130099 A1 | 6/2006 | Rooyen |
| 2006/0130101 A1 | 6/2006 | Wessel van Rooyen et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0147471 A1 | 7/2006 | Borodic et al. |
| 2006/0149850 A1 | 7/2006 | Bowman |
| 2006/0156392 A1 | 7/2006 | Baugher et al. |
| 2006/0161635 A1 | 7/2006 | Lamkin et al. |
| 2006/0165173 A1 | 7/2006 | Kim et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0236358 A1 | 10/2006 | Liu et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0049245 A1 | 3/2007 | Lipman |
| 2007/0053513 A1 | 3/2007 | Hoffberg et al. |
| 2007/0067851 A1 | 3/2007 | Fernando et al. |
| 2007/0073704 A1 | 3/2007 | Bowden et al. |
| 2007/0075372 A1 | 4/2007 | Terashima et al. |
| 2007/0076728 A1 | 4/2007 | Rieger et al. |
| 2007/0094691 A1 | 4/2007 | Gazdzinski |
| 2007/0113246 A1 | 5/2007 | Xiong |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0153820 A1 | 7/2007 | Gould |
| 2007/0154041 A1 | 7/2007 | Beauchamp |
| 2007/0180230 A1 | 8/2007 | Cortez |
| 2007/0204300 A1 | 8/2007 | Markley et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt |
| 2008/0098212 A1 | 4/2008 | Helms et al. |

(56) References Cited

U.S. PATENT DOCUMENTS

| | | |
|---|---|---|
| 2008/0098450 A1 | 4/2008 | Wu et al. |
| 2008/0101460 A1 | 5/2008 | Rodriguez |
| 2008/0103564 A1 | 5/2008 | Burkinshaw et al. |
| 2008/0112405 A1 | 5/2008 | Cholas et al. |
| 2008/0133551 A1 | 6/2008 | Wensley et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin et al. |
| 2008/0162353 A1 | 7/2008 | Tom et al. |
| 2008/0192820 A1 | 8/2008 | Brooks et al. |
| 2008/0198780 A1 | 8/2008 | Sato |
| 2008/0201748 A1 | 8/2008 | Hasek et al. |
| 2008/0222684 A1 | 9/2008 | Mukraj et al. |
| 2008/0229379 A1 | 9/2008 | Akhter |
| 2008/0235746 A1 | 9/2008 | Peters et al. |
| 2008/0244667 A1 | 10/2008 | Osborne |
| 2008/0273591 A1 | 11/2008 | Brooks et al. |
| 2008/0282299 A1 | 11/2008 | Koat et al. |
| 2008/0320540 A1 | 12/2008 | Brooks et al. |
| 2009/0025027 A1 | 1/2009 | Craner |
| 2009/0030802 A1 | 1/2009 | Plotnick et al. |
| 2009/0031335 A1 | 1/2009 | Hendricks et al. |
| 2009/0083279 A1 | 3/2009 | Hasek et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0141696 A1 | 6/2009 | Chou et al. |
| 2009/0150917 A1 | 6/2009 | Huffman et al. |
| 2009/0172776 A1 | 7/2009 | Makagon et al. |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0282241 A1 | 11/2009 | Prafullchandra et al. |
| 2009/0293101 A1 | 11/2009 | Carter et al. |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0043030 A1 | 2/2010 | White |
| 2010/0083329 A1 | 4/2010 | Joyce et al. |
| 2010/0086020 A1 | 4/2010 | Schlack |
| 2010/0106846 A1 | 4/2010 | Noldus et al. |
| 2010/0115091 A1 | 5/2010 | Park et al. |
| 2010/0122274 A1 | 5/2010 | Gillies et al. |
| 2010/0125658 A1 | 5/2010 | Strasters |
| 2010/0131973 A1 | 5/2010 | Dillon et al. |
| 2010/0135646 A1 | 6/2010 | Bang et al. |
| 2010/0138900 A1 | 6/2010 | Peterka et al. |
| 2010/0169977 A1 | 7/2010 | Dasher et al. |
| 2010/0217613 A1 | 8/2010 | Kelly |
| 2010/0223392 A1* | 9/2010 | Pond ............... H04N 21/23424 709/231 |
| 2010/0228121 A1 | 9/2010 | Kazuhiro et al. |
| 2010/0251304 A1 | 9/2010 | Donoghue et al. |
| 2010/0269144 A1 | 10/2010 | Forsman et al. |
| 2010/0287609 A1 | 11/2010 | Gonzalez et al. |
| 2010/0313225 A1 | 12/2010 | Cholas et al. |
| 2010/0325547 A1 | 12/2010 | Keng et al. |
| 2011/0071841 A1 | 3/2011 | Fomenko et al. |
| 2011/0078731 A1 | 3/2011 | Nishimura |
| 2011/0090898 A1 | 4/2011 | Patel et al. |
| 2011/0093900 A1 | 4/2011 | Patel et al. |
| 2011/0103374 A1 | 5/2011 | Lajoie et al. |
| 2011/0126244 A1 | 5/2011 | Hasek |
| 2011/0145049 A1 | 6/2011 | Hertel et al. |
| 2011/0173053 A1 | 7/2011 | Aaltonen et al. |
| 2011/0173095 A1 | 7/2011 | Kassaei et al. |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0276881 A1 | 11/2011 | Keng et al. |
| 2011/0277008 A1 | 11/2011 | Smith |
| 2012/0008786 A1 | 1/2012 | Cronk et al. |
| 2012/0011567 A1 | 1/2012 | Cronk et al. |
| 2013/0097647 A1 | 4/2013 | Brooks et al. |
| 2013/0117692 A1 | 5/2013 | Padmanabhan et al. |
| 2014/0074855 A1 | 3/2014 | Zhao et al. |
| 2014/0201799 A1 | 7/2014 | Smith |

FOREIGN PATENT DOCUMENTS

| | | |
|---|---|---|
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0110125 A1 | 2/2001 |
| WO | WO-0139505 A2 | 5/2001 |
| WO | WO-2005015422 A1 | 2/2005 |
| WO | WO-2005031524 A2 | 4/2005 |
| WO | WO-2007060451 A2 | 5/2007 |
| WO | WO-2012021245 A1 | 2/2012 |

OTHER PUBLICATIONS

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

DLNA (Digital Living Network Alliance) protocols described in DLNA Networked Device Interoperability Guidelines Expanded, Mar. 2006 and subsequent expanded version dated Oct. 2006.

DOCSIS 3.0 Management Features Differences Technical Report CM-TR-MGMTv3 0-DIFF-V01-071228, pp. 1-62.

DOCSIS 3.0 OSSI Configuration Management Technical Report CM-TR-OSSIv3 0-CM-V01-080936 pp. 1-84.

OpenCable, Enhanced TV Binary Interchange, Format 1.0 OC-SP-ETV-BIF1.0-104-070921 Date: Sep. 21, 2007, 420 pages.

OpenCable Specifications, Tuning Resolver Interface Specification, OS-SP-TRIF-I01-080130, Jan. 30, 2008, pp. 1-50.

Redux screenshot from http://www.redux.com, "Select a channel to start watching" © 2014 Redux, Inc.014 Redux, Inc. All rights reserved; http://www.redux.com/; 2 pages.

UTF-32, IBM, retrieved from http://publib.boulder.ibm.com/infocenter/iseries/v5r3/index.jsp?topic=%2Fnls%DFrbagsutf32.htm on Aug. 28, 2013.

* cited by examiner

APPARATUS AND METHODS FOR PACKETIZED CONTENT DELIVERY OVER A BANDWIDTH-EFFICIENT NETWORK

This application is a continuation of, and claims priority to, co-owned and co-pending U.S. patent application Ser. No 14/663,233 of the same title and filed Mar. 19, 2015, issuing U.S. Pat. No. 9,961,413 on May 1, 2018, which is a divisional of and claims priority to co-owned and co-pending U.S. patent application Ser. No. 12/841,906 of the same title and filed Jul. 22, 2010, issued as U.S. Pat. No. 8,997,136 on Mar. 31, 2015, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data transmission. In one exemplary aspect, the invention relates to the use of a network architecture for providing content and data via content distribution (e.g., cable) networks using a packetized protocol.

2. Description of Related Technology

The provision of content to a plurality of subscribers in a content-based network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Just as different varieties of content delivery services have evolved over time, several different network architectures have also evolved for deploying these services. These architectures range from fully centralized (e.g., using one or more centralized servers to provide content to all consumers) to fully distributed (e.g., multiple copies of content distributed on servers very close to the customer premises, at the "edge" of the distribution network), as well as various other configurations. Some distribution architectures (e.g., HFC cable, HFCu, etc.) consist of optical fiber towards the "core" of the network, which is in data communication with a different medium (coaxial cable radio frequency, copper POTS/PSTN wiring, etc.) distribution networks towards the edge.

Satellite networks similarly use a radio frequency physical layer (i.e., satellite transceiver and associated settop box and satellite dish located at each of the consumer's premises) to transmit digital television and data signals.

HFCu networks utilize existing copper (e.g., POTS/PSTN or CAT-5) cabling within the premises for the "last mile"; however, one salient downside to this approach is severe bandwidth constraints (e.g., on the order of 25-30 mbps). At 25 mbps, roughly 6 mbps is allocated for Internet access, leaving the remaining 19 mbps for HD/SD video and voice (e.g., VoIP). VoIP bandwidth is effectively trivial for both upstream and downstream bandwidth, but video (especially HD quality) consumes great amounts of bandwidth. Hence, the user of an HFCu system rapidly becomes bandwidth-limited for next-generation/commonly required technologies such as HD video provided with high-speed broadband data service.

While the details of how video is transported in the network can be different for each architecture, many architectures will have a transition point where the video signals are modulated, upconverted to the appropriate RF channel and sent over the coaxial segment(s), copper wiring, (or air interface) of the network. For example, content (e.g., audio, video, etc.) is provided via a plurality of downstream ("in-band") RF QAM channels over a cable or satellite network. Depending on the topology of the individual plant, the modulation and upconversion may be performed at a node, hub or a headend. In many optical networks, nodes receive optical signals which are then converted to the electrical domain via an optical networking unit (ONU) for compatibility with the end-user's telephony, networking, and other "electrical" systems.

In U.S. cable systems for example, downstream RF channels used for transmission of television programs are 6 MHz wide, and occupy a 6 MHz spectral slot between 54 MHz and 860 MHz. Within a given cable plant, all homes that are electrically connected to the same cable feed running through a neighborhood will receive the same downstream signal. For the purpose of managing services, these homes are aggregated into logical groups typically called service groups. Homes belonging to the same service group receive their services on the same set of in-band RF channels.

Cable and satellite signals are transmitted using a QAM scheme and often use MPEG (e.g., MPEG-2) audio/video compression. Hence, available payload bitrate for typical modulation rates (QAM-256) used on HFC systems is roughly 38 Mbps. A typical rate of 3.75 Mbps is used to send one video program at resolution and quality equivalent to NTSC broadcast signals (so-called "Standard Definition (SD)" television resolution). Use of MPEG-2 and QAM modulation enables carriage of 10 SD sessions on one RF channel (10×3.75=37.5 Mbps<38 Mbps). Since a typical service group consists of 4 RF channels, 40 simultaneous SD sessions can be accommodated within a service group. These numbers work out very well for many deployment scenarios, such as the following example. A typical "service area" neighborhood served by a coaxial cable drop from the cable network consists of 2000 homes, of which about two-thirds are cable subscribers, of which about one-third are digital cable subscribers, of which about 10% peak simultaneous use is expected. Hence, the bandwidth required to meet service requirements is 2000×(⅔)×(⅓)× 0.1=approximately 40 peak sessions—the exact number supported by a 4 QAM service group. Since high-definition (HD) sessions require a greater bandwidth (typically 15 Mbps), less of these sessions can be accommodated.

Broadband data carriage in such networks is often accomplished using other (typically dedicated) QAM channels. For instance, the well known DOCSIS specifications provide for high-speed data transport over such RF channels in parallel with the video content transmission on other QAMs carried on the same RF medium (i.e., coaxial cable). A cable modem is used to interface with a network counterpart (CMTS) so as to permit two-way broadband data service between the network and users within a given service group.

Out-of-band (OOB) channels (and associated protocols) may be used to deliver metadata files to a subscriber device, as well as to provide communication between the headend of the content-based network and the subscriber devices.

Other systems and methods may also be used for delivering media content to a plurality of subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the IP protocol. IPTV is managed in a way so as to provide the required level of quality of service (QoS), quality of experience (QoE), security, interactivity, and reliability via intelligent terminals such as PCs, STBs, handhelds, TV, and other terminals. IPTV service is usually delivered over a complex and heavy "walled garden" network, which is carefully engineered to ensure sufficient bandwidth for delivery of vast amounts of multicast video traffic.

IPTV uses standard networking protocols for the delivery of content. This is accomplished by using consumer devices having broadband Internet connections for video streaming. Home networks based on standards such as "next generation" home network technology can be used to deliver IPTV content to subscriber devices in a home.

So-called "Internet TV", on the other hand, generally refers to transport streams sent over IP networks (normally the Internet) from outside the network (e.g., cable, HFCu, satellite, etc.) that connects to the user's premises. An Internet TV provider has no control over the final delivery, and so broadcasts on a "best effort" basis, notably without QoS requirements.

There is also a growing effort to standardize the use of the 3GPP IP Multimedia System (IMS) as an architecture for supporting IPTV services in carriers networks, in order to provide both voice and IPTV services over the same core infrastructure. IMS-based IPTV may be adapted to be compliant with the IPTV solutions specifications issued by many IPTV standards development organizations (SDOs), such as, e.g., Open IPTV Forum, ETSI-TISPAN, ITU-T, etc.

While delivery of packetized content is well known in the prior art, the ability to provide delivery of packetized (e.g., IP) media content to a subscriber device over a content delivery network (e.g., cable television HFC, HFCu, satellite, etc.), other than over the Internet as afforded by virtue of a satellite, cable, or other such modem (i.e., "Internet TV"), and/or by using expensive spectrum resources (e.g., via a CMTS), has been lacking. Still further, these systems require content to be duplicated for enabling legacy (non-IP enabled) CPE access, thereby requiring duplicate spectrum to be occupied.

Moreover, extant Internet TV and IPTV solutions (regardless of bearer medium) lack the ability to provide the entire "carrier class" (i.e., high quality/bitrate content) stream; i.e., all content which would be available using linear content delivery methods, as well as other content types (e.g., video on-demand (VOD), network digital video recorder (DVR) content, etc.).

It is further noted that current carrier class stream delivery mechanisms require mechanisms for conserving and/or efficiently using bandwidth. For example, Broadcast Switched Architecture (BSA; also commonly known as "switched digital video" or "SDV") content delivery networks, such as that described in co-assigned application Ser. No. 09/956, 688, filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, may be utilized to selectively deliver only a subset of available programming to network subscribers in order to optimize bandwidth. Delivery of programming under this mechanism is typically based on customer requests (or lack thereof) for programming; however, bandwidth consumption may vary greatly during the day. In a fixed bandwidth model, the BSA architecture delivers a fixed amount of programming based on the fixed bandwidth constraint; the programming actually delivered at any given time will be only a fraction of the total of the programming available to the user base.

One prospective solution to delivering carrier class programming in a packet transport form (e.g., H.264 encoded content in an IP wrapper) is to obtain additional high-capacity CMTS equipment that would enable generation of additional downstream QAMs to carry the content. This CMTS-based approach suffers from several disabilities, however, including: (i) the comparatively high cost and high degree of infrastructure modification required; and (ii) the need to carry both traditional (e.g., MPEG-2) and next generation (e.g., IP encapsulated) content streams in parallel to service legacy and IP STBs, respectively.

A network operator such as a cable MSO must manage and reduce the "cost-per-channel" so as to be competitive with other delivery paradigms such as broadcast switched architecture (BSA) and VOD. Development of highly specialized and high-capacity CMTS equipment to deliver the next generation IP content in sufficient quantity requires very significant NRE (non-recurring engineering) and development costs, and moreover the number of such devices needed within all content delivery networks will be comparatively small, thereby tending to minimize any downward price pressure for this equipment (and hence reducing its cost viability in comparison with BSA, VOD, or other low-cost legacy delivery models).

Additionally, the aforementioned CMTS-based approaches generally segregate the QAM pool used for delivery of the IP services from those used to carry broadcast or linear content. This results in not only the need for more equipment and QAMs, but also necessitates at least to some degree the carriage of both legacy (e.g., MPEG-2) and IP content, since the next-generation IP STBs cannot decode the MPEG-2 streams, and vice versa. This is obviously very bandwidth inefficient.

For example, one such prior art approach is offered by BigBand Networks, Inc., and effectively segregates IP-carrying QAMs into a pool viewable only by IP-enabled STBs. However, the IP encapsulation is performed at the network headend, and no free intermixing of the IP-carrying streams and normal broadcast content occurs.

Hence, improved apparatus and methods are needed to provide delivery of the entire carrier class stream as IP packetized content to consumer devices, while still maintaining delivery of this carrier class stream in the form of legacy linear (e.g., MPEG-2 broadcast) content, and without any significant modification of the network infrastructure, or additional investment in spectrum. Ideally, the two types of content (legacy and next-generation IP content) could be freely intermixed on extant network infrastructure, even at the service group level so as to allow legacy and IP-enabled users within a service group to be serviced by the same infrastructure, and in a cost-efficient manner.

SUMMARY OF THE INVENTION

The present invention addresses the foregoing needs by disclosing apparatus and methods for content management and account linking across entities of two networks.

In a first aspect of the invention, a method of operating a content distribution network is disclosed. In one embodiment, the method delivers both legacy encoded and IPTV content via a switched digital system, and comprises: receiving a request for the IPTV content at the system issued from a requesting device; determining if the IPTV content is currently being delivered over the system; if the IPTV content is currently being delivered, providing the requesting device information on how to access the content; if the IPTV content is not currently being delivered, switching in at least one stream via the system to effect delivery of the IPTV content; and providing the legacy encoded content via the switching system to at least one user in the same service group of the requesting device.

In one variant, the IPTV content is encoded using a codec that is both different and more bandwidth efficient than that used for the legacy encoded content.

In another variant, the IPTV content includes digital rights management (DRM) protection, whereas the legacy encoded content is protected using a conditional access system.

In a second aspect of the invention, a method for providing a plurality of content to a consumer device in a content delivery network is disclosed. In one embodiment, the method comprises: receiving a selection of at least one of the plurality of content from the consumer device; sending a request for the selected at least one of the plurality of content to a server, the server providing bandwidth optimized delivery of content; receiving from the server a multi-program transport stream (MPTS) including the selected at least one of the plurality of content; demodulating the MPTS to extract one or more elementary streams associated with the selected at least one of the plurality of content; formatting the one or more elementary streams; and providing the one or more elementary streams to the at least one of the plurality of consumer devices.

In one variant, the act of sending the request for the selected at least one of the plurality of content to a server comprises formatting the request to include a source identifier of the selected at least one of the plurality of content.

In another variant, the act of formatting the one or more elementary streams comprises encapsulating the one or more elementary streams according to the Internet Protocol (IP), and the act of providing the one or more elementary streams comprises exposing a multicast address of the one or more elementary streams, the at least one of the plurality of consumer devices being configured to identify the multicast addresses and stream the selected content.

In a third aspect of the invention, a method for providing a plurality of content encoded according to first protocol and a plurality of content encoded according to a second protocol to a plurality of consumer devices of a content distribution network is disclosed. In one embodiment, the method comprises: receiving from a first one of the plurality of consumer devices a first request, the first request comprising a request for access to a first one of the plurality of content encoded according to the first protocol; receiving from a second one of the plurality of consumer devices a second request, the second request comprising a request for access to a second one of the plurality of content encoded according to the second protocol; sending the first and second requests to a server for providing bandwidth optimized delivery of content; receiving from the network a multi-program transport stream (MPTS) comprising a multiplex of at least the first one of the plurality of content encoded according to the first protocol and the second one of the plurality of content encoded according to the second protocol; and providing from the multiplex the first one of the plurality of content encoded according to the first protocol to the first one of the plurality of consumer devices, and the second one of the plurality of content encoded according to the second protocol to the second one of the plurality of consumer devices. Providing of the first one of the plurality content comprises encapsulating the first one of the content using a networking protocol before delivery to the first one of the consumer devices.

In one variant, the first protocol comprises MPEG-4 encoding and the second protocol comprises MPEG-2 encoding, and the first one of the plurality of consumer devices comprises a consumer device capable of decoding the MPEG-4 content and implementing digital rights management (DRM) rules on the content. The second one of the plurality of consumer devices comprises a legacy consumer device, and the second one of the content is protected according to a conditional access system that is not DRM-based.

In another variant, the server freely intermixes the first and second ones of the content without regard to the first or second encoding protocols.

In a fourth aspect of the invention, a computer readable apparatus is disclosed. In one embodiment, the apparatus comprises a medium adapted to store a computer program, the computer program configured to when executed: receive a request for IP packetized content from at least one consumer device; format said request to a protocol utilized by a switched digital video (SDV) server configured to optimize bandwidth by dynamically adding and removing the IP packetized content to or from a currently provided multiplex according to existing requests; transmit the request to the SDV server; extract one or more elementary streams associated with the requested IP packetized content from a received multiplex; encapsulate the one or more elementary streams according to a networking protocol; and provide the one or more encapsulated elementary streams to the at least one consumer device.

In a fifth aspect of the invention, a method of operating a content distribution network having both switched channels and non-switched channels is disclosed. In one embodiment, the method comprises: for content that is not access restricted, transmitting this content only on one or more non-switched channels; and for content that is access restricted, transmitting this content only on one or more switched channels.

In one variant, the switching comprises: switching out of delivery individual ones of program streams when no user of the network is watching them; and switching individual ones the program streams in for delivery when one or more request for them exists.

In another variant, the content that is not access restricted comprise at least one of public, educational, government, or emergency content.

In a sixth aspect of the invention, premises apparatus configured to receive content from a content distribution network is disclosed. In one embodiment the apparatus comprises: a processor, and at least one storage device in communication with the processor, the at least one storage device comprising at least one computer program. The program is configured to, when executed on the processor: receive the content from the network, encapsulate the received content according to a networking protocol; and transmit the encapsulated content to a premises device adapted to utilize the protocol. The receipt, encapsulation and transmission comprise no other processing of the audio or video portions of the received content.

In one variant, the networking protocol comprises the Internet Protocol (IP), and the encapsulation further comprises including at least one IP header having a multicast address associated therewith.

In another variant, the received content comprises digital rights management (DRM) information, and the DRM information is not processed or utilized by the apparatus.

In a seventh aspect of the invention, a method of operating a premises content distribution apparatus is disclosed. In one embodiment, the apparatus comprises: receiving protected content at a first premises device from a network, encapsulating the received protected content according to a networking protocol; and transmitting the encapsulated protected content to a second device adapted to utilize the protocol; and utilizing a digital rights management (DRM) enabled media player application of the second device to access the protected content. The receiving, encapsulating and transmitting comprise no decrypting or decoding of the video or audio portion of the received content.

In another variant, the received content comprises at least one stream within an MPEG-2 multi-program transport stream (MPTS), and the receiving comprises demodulating and extracting the at least one stream from the MPTS.

These and other aspects of the invention shall become apparent when considered in light of the disclosure provided herein.

Figure 1:
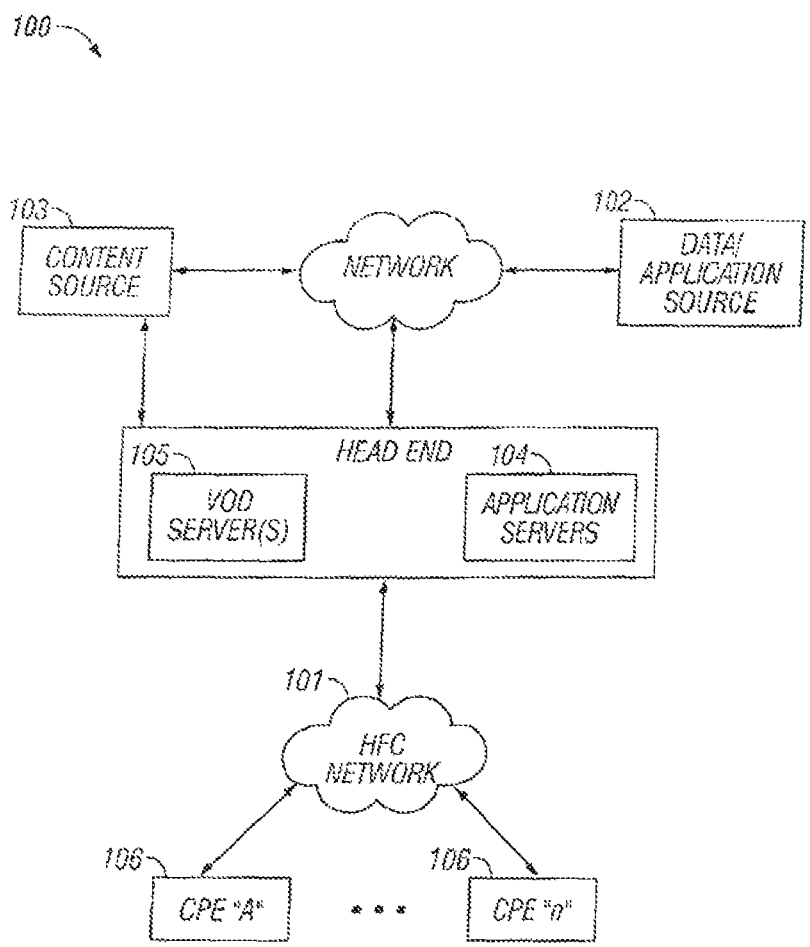
FIG. 1 is a functional block diagram illustrating an exemplary hybrid fiber network configuration useful with the present invention.

All Figures and Appendices© Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers to any type of electronic equipment located within a customer's or user's premises and connected to or in communication with a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein., the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the tend "Wi-Fi" refers to, without limitation, any of the variants of IEEE-Std. 802.11 or related standards including e.g., 802.11 a/b/g/i/n/v/z.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present invention discloses, inter alia, methods and apparatus for providing packetized content to subscribers of an MSO network via extant bandwidth-optimized network infrastructure. In one embodiment, various legacy and IP-capable user devices receive a list of available content, from which a user may select. The user's selection is transmitted to an intermediary device or proxy (such as gateway apparatus in the home, or a headend server) which formats the request according to a standardized protocol utilized by a server (e.g., a BSAJSDV server) for providing bandwidth-optimized delivery of content. The server uses one or more bandwidth optimization techniques to provide the requested content to the proxy. If the content is requested by an IP-capable device, the proxy formats the content using protocol translation. The formatted content is then delivered to the requesting IP-capable CPE. However, if the content is requested from a legacy device (e.g., a non-IP enabled STB), protocol translation is not necessary. In this manner, IP and legacy CPE can be freely intermixed in any proportion in the service group and home, the gateway or headend proxy being configured to deliver content regardless of the requesting device.

In one variant, the content provided to the IP-capable CPE comprises the full range of content which is normally provided to users over traditional RF transport; i.e., the "entire carrier class stream" is made available by the MSO as IP content. Additionally, other types of content may be contemporaneously provided including e.g., VOD content, start over content, look back content, network personal video recorder (nPVR) or digital video recorder (nDVR) content, etc.

Additionally, the methods and apparatus described herein may be utilized to provide MPEG-2 encoded content to the IP-capable devices capable of decoding both MPEG-2 and MPEG-4 content. The MPEG-2 content may, in one embodiment, include so-called "in-the-clear content"; i.e., content which is provided to users unprotected and which is never switched in or out of the program lineup, but rather is "always on". The in-the-clear content may comprise for instance public, educational and government (PEG) content, which is tuned to directly by the proxy device (e.g., gateway, modem, or network server) and then formatted for transmission to the IP CPE. In this fashion, the "always on" content is advantageously always available for both IP-enabled and legacy STBs.

The invention takes advantage of currently deployed bandwidth-optimizing architecture (including e.g., BSA/ SDV servers, etc.), thereby requiring no additional constraints on available QAMs. No additional QAM infrastructure needs to be purchased, nor any portion of the network significantly reconfigured or changed according to the present invention, since no new spectrum is occupied by the addition of the entire carrier class stream as IP/MPEG-4 encoded content.

It is further appreciated that, in the instance a premises gateway or similar device is utilized as a proxy for the IP-capable CPE, the proxy may utilize only off-the-shelf components including e.g., a DOCSIS 3.0 modem, one or more QAM tuners, and extant DLNA protocols. The gateway device may be re-purposed for future data-only delivery as well. There is no requirement for the gateway or similar device when acting as a proxy according to the present invention to have video "awareness" or processing capabilities, thereby advantageously reducing its cost and complexity.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a cable system with 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, in one embodiment the CPE may include IP-enabled CPE 107 (although not illustrated in FIGS. 1-1d), and a gateway or specially configured modem (e.g., DOCSIS cable modem).

Figure 1A:
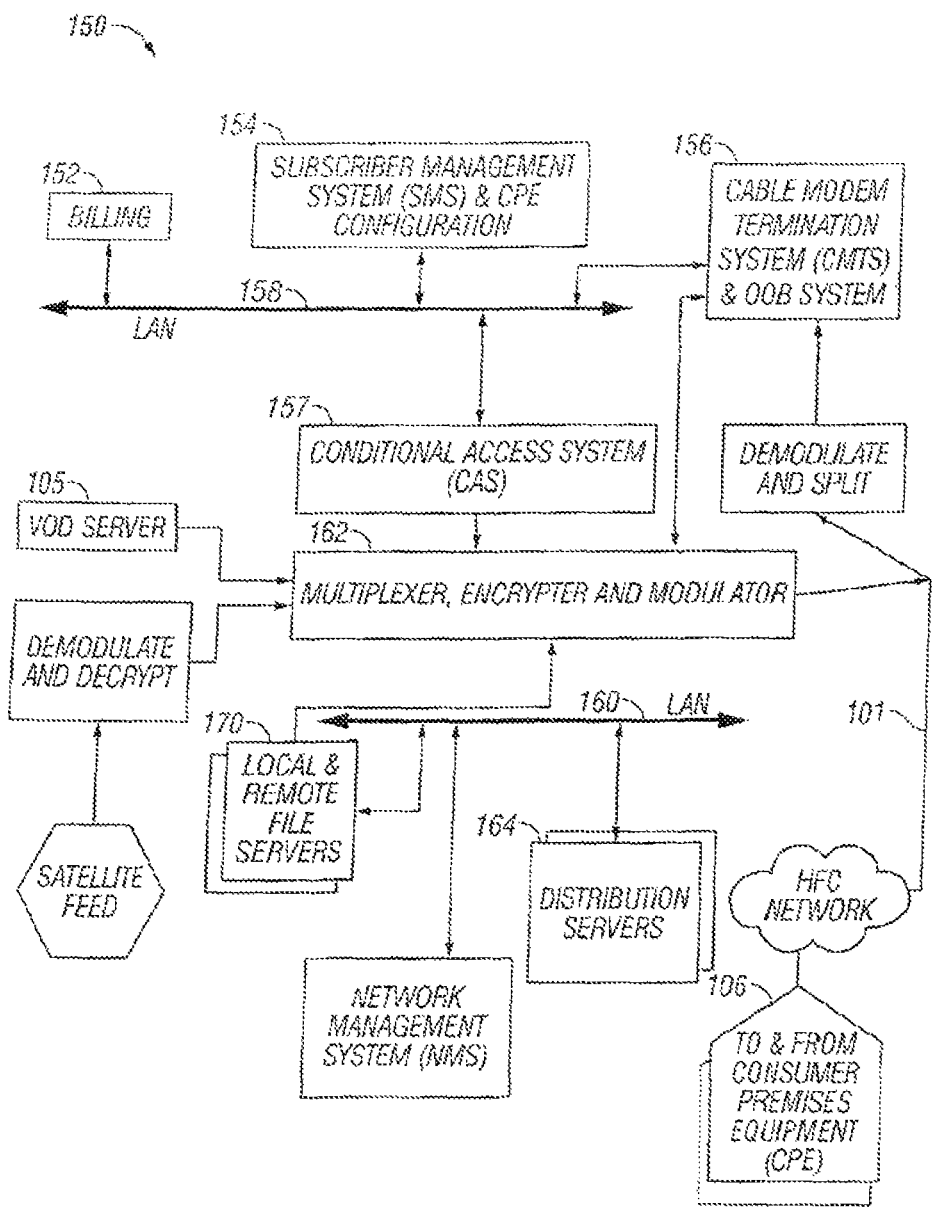
FIG. 1a is a functional block diagram illustrating one exemplary network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
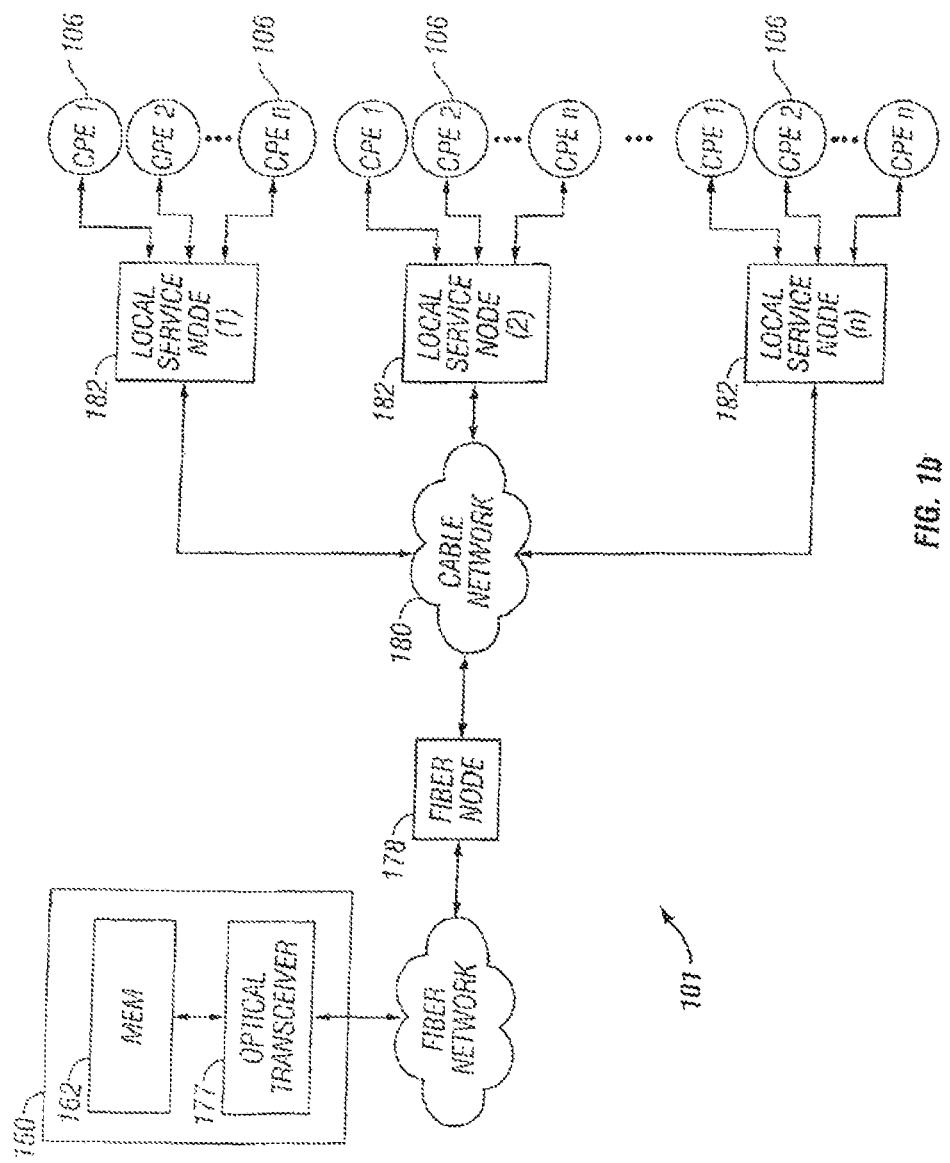
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
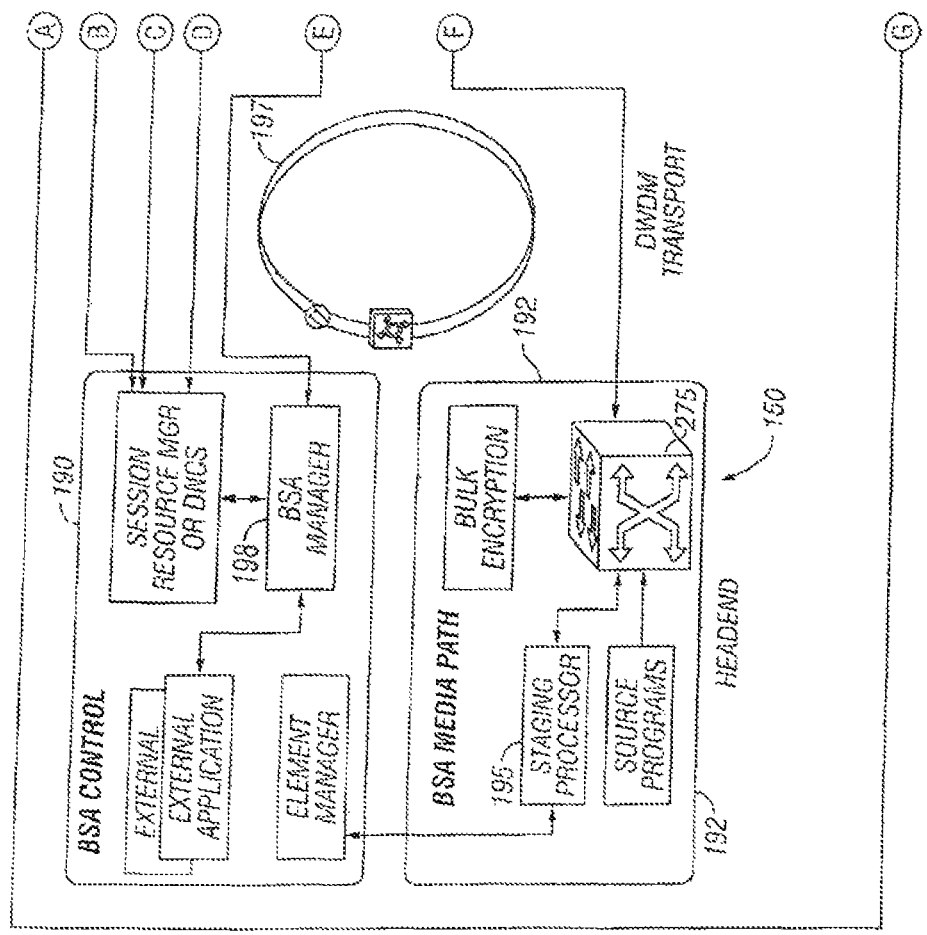
FIG. 1c is a functional block diagram illustrating one exemplary broadcast switched architecture (BSA) network useful with the present invention.
Figure 1C:
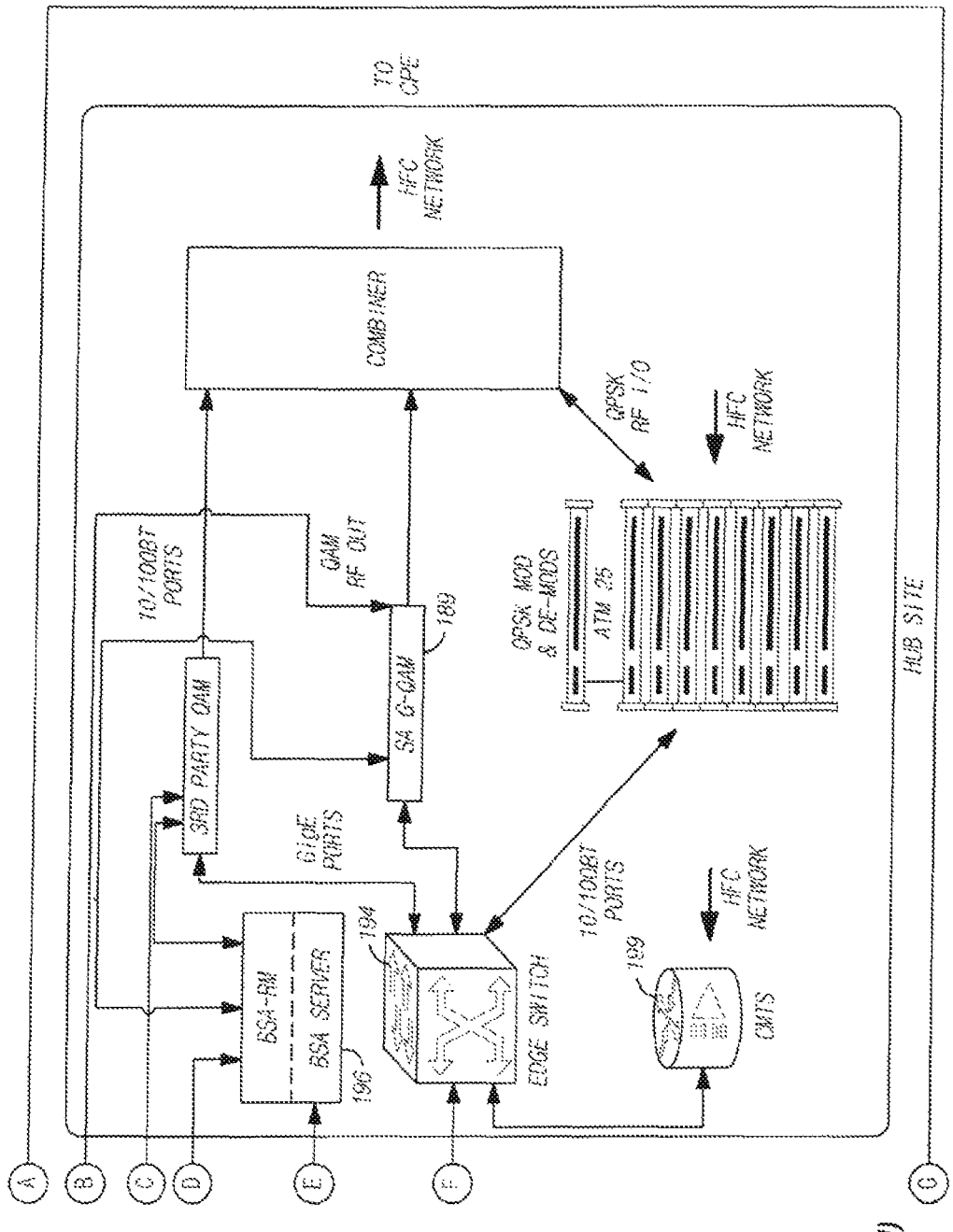

It will also be recognized, however, that the multiplexing operation(s) need not necessarily occur at the headend 150 (e.g., in the aforementioned MEM 162). For example, in one variant, at least a portion of the multiplexing is conducted at a BSA/SDV switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

"Switched" Networks

FIG. 1c illustrates an exemplary "switched" network architecture. While a so-called "broadcast switched architecture" (BSA), also known as "switched digital video" or "SDV", network is illustrated in this exemplary embodiment for performing bandwidth optimization/conservation functions, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA or SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

As previously referenced, U.S. patent application Ser. No. 09/956,688 entitled "TECHNIQUE FOR EFFECTIVELY PROVIDING PROGRAM MATERIAL IN A CABLE TELEVISION SYSTEM" describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bitrates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bitrates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VOD) also have their lowest demands. Edge QAM resource sharing with VOD is therefore not expected to provide significant interleaving bandwidth gains. However, the BSA system can be advantageously operated to allow this surplus bandwidth to be utilized in other ways, such as for transport of IP streams, data, video, voice, or even future applications which would require additional bandwidth.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiments of the present invention, the edge switch 194 (generally located in the distribution hub as shown in FIG. 1c) may be flooded with all available programs (so-called "dense" mode) Alternatively, the system may be configured to operate in a "sparse" mode, wherein IP streams are only delivered when the SDV server/resource manager requests them (such as via signaling the QAM modulator, which signals the router to perform a multicast membership request for a stream not presently carried). In this latter case, the physical switching function takes place in the router (as requested by the QAM modulator, responsive to the SDV server/resource manager request). The SDV server/resource manager is often located in the headend (versus the hub), since payloads do not pass through it, only control traffic.

Under the "flooding" (sometimes called "dense") paradigm, transport efficiency may be improved through use of simple unidirectional "drop and continue" protocol performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Packetized Content Delivery Network Architecture—

As previously discussed, the aforementioned packetized content delivery approach generally comprises delivery of select packetized content over e.g., DOCSIS QAMs, and is not capable of delivering an entire carrier class stream (i.e., all high bitrate content which would normally be delivered via linear broadcast technologies). The architecture of FIGS. 2a and 2b in contrast enables delivery of the entire carrier class stream using extant content delivery infrastructure, and without the use of additional spectrum. Further, no new CMTS/QAM infrastructure or development thereof, are necessary.

The advantage of not needing additional spectrum is realized primarily by the one-to-one replacement of RF or legacy CPE 106 with IP-enabled CPE 107. Network capacity must be increased such as by node splitting or adding QAMs if the overall number of requesting devices increases significantly, however, assuming no such changes, legacy and IP-enabled devices can be readily traded using the present invention.

In one embodiment, "in the clear" MPEG-2 streams already carried on broadcast QAMs may be tuned to by the gateway and decoded by the CPE 106, 107, thereby freeing the BSA system from the statistical loading of the most popular "peak busy hour" simulcast streams at the SDV server 196. A method for providing such in the clear content to IP-capable CPE is discussed below.

Moreover, current peak-hour BSA data indicates that 7 out of 10 streams (70%) have only one user device 106, 107 viewing. The remaining streams are viewed by multiple devices. Each time a new stream is added, the probability is 7 out of 10 that it will have but a single destination (effectively unicast). This trend is expected to continue as more and more so-called "long-tail" content is offered by service providers.

Since the MPEG-4/H.264 DRM-based streams needed by IP-enabled CPE 107 are not viewable by legacy (e.g., PowerKey enabled) devices, they must be duplicated. However, they are advantageously roughly half the bit rate of a comparable MPEG-2 encoded stream, particularly when they are carried (as they are in the exemplary embodiments of the present invention) without the burden of DOCSIS framing or if headers. As will be discussed below, certain embodiments of the invention add the IP headers or "wrapper" after carriage to the subscriber premises.

Since (anecdotally) about 7 of 10 added streams have only one viewer and as such are effectively unicast, the format (DRM or PowerKey or MPEG type) can be any type without increasing the required bandwidth. Since IPTV streams are about half the bit rate, this represents a decrease in the amount of BSA/SDV server 196 bandwidth consumed (depending on the portion of the aforementioned "7 of 10" streams with only one viewer that use H.264/MPEG-4 encoding consuming half the bandwidth). However, this gain is offset by the fact that the other 3 out of 10 streams must be carried in duplicate (since there may be users viewing with both legacy devices and IP-enabled CPE), resulting in a 50% increase in SDV server 196 bandwidth consumed for those streams.

The resulting net bandwidth consumption pattern shows a gradually decreasing demand for SDV server bandwidth as the fraction of MPEG-4 capable H.264 DRM-CA devices over time increases with respect to MPEG-2 PowerKey devices.

Figure 2A:
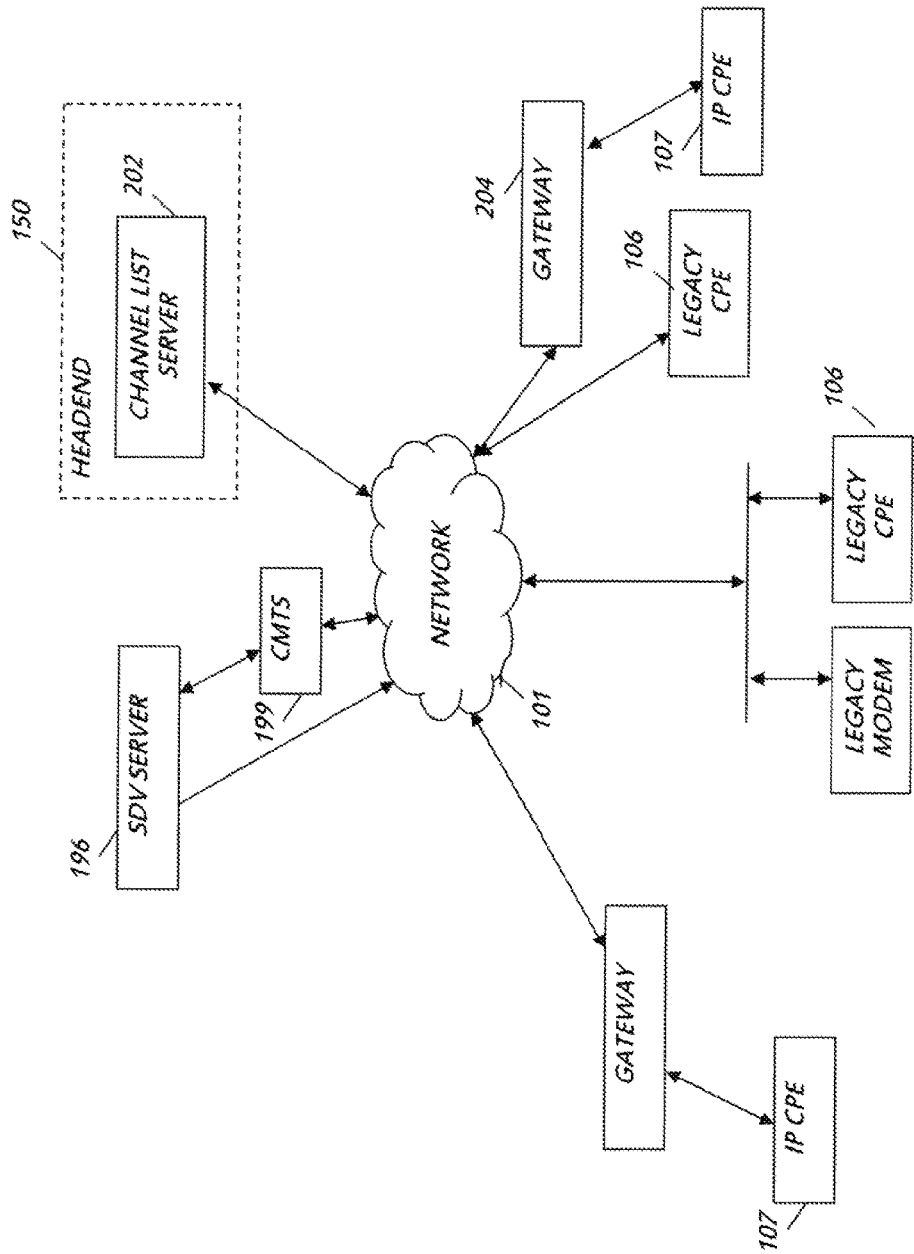
FIG. 2a is a functional block diagram illustrating a content delivery network architecture configured in accordance with one embodiment of the present invention.

Referring now to FIG. 2*a*, a first exemplary network architecture for the delivery of packetized (such as IP packetized) content, as well as legacy (e.g., linear broadcast) content is illustrated. As shown, the network generally comprises a BSA or SDV server 196 in communication with a plurality of IP-capable user devices 107 and/or legacy consumer premises equipment (CPE) 106 via a network 101, CMTS 199 and data gateway device 204. It will be appreciated that while three variants of premises configuration are shown (i.e., a gateway serving an IP-enabled CPE 107 only, both IP-enabled gateway and legacy CPE, and (iii) a legacy CPE 106 (and legacy cable modem) operating directly in communication with the network), other premises configurations may be used consistent with the invention. For example, as described in greater detail subsequently herein, the functions of one or both of the IP-enabled and/or legacy CPE may be integrated into the gateway device or vice versa. Also, a legacy CPE that incorporates IP connectivity with sufficient bitrate (e.g. MoCA or a wired or wireless Ethernet connection) may, via a software/firmware update, be re-purposed to view IP content, and even utilize DRM encryption given the proper media player and/or software decryption capability. As another alternative, a modem (e.g., DOCSIS 3.0 enabled cable modem) may include the functionality of the gateway, or vice versa. Myriad other combinations and configurations will be recognized by those of ordinary skill given the present disclosure. A headend 150 channel list server 202 is also in communication with the IP CPE 107 via the network. While shown as communicating via the gateway 204 using a CMTS interface, the CPE 107 may be configured to be in contact directly with the server (i.e., bypass the gateway, such as via use of another communication channel), or via another premises component.

As will be discussed in greater detail below, the network architecture of FIG. 2*a* may be used to provide linear broadcast (and other non-IP packetized content) to legacy CPE 106, as well as to provide IP packetized content to the IP-enabled CPE 107. As noted above, the IP packetized content may advantageously include the entire carrier class stream.

The provided content may include any content which would ordinarily be broadcast to the devices, yet encoded in MPEG-4 (or other IP encoding standard or codec). For example, broadcast content, VOD content, so called "quick clips" content (described in co-owned U.S. Pat. No. 7,174, 126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be provided either in a legacy format, or in an MPEG-4/H.264 encoded format, or both, using the present invention. Other types of content may also be utilized consistent with the invention.

CMTS 199 devices are well known in the art, and available via any number of manufacturers such as the Cisco® Universal Broadband Router (uBR), the Motorola® CMTS Edge Router, and the ARRIS® C4 CMTS, etc. Any of the aforementioned CMTS devices may be used in conjunction with the present invention. In other words, the present invention advantageously does not require any changes to the currently available CMTS devices. Furthermore, no additional spectrum or QAM modulators are necessary for practicing the invention. However, as is discussed below, the CMTS 199 may be expanded for the delivery of VOD content.

In one exemplary embodiment, the SDV server 196 is of the type disclosed in U.S. patent application Ser. No. 09/956,688 entitled "TECHNIQUE FOR EFFECTIVELY PROVIDING PROGRAM MATERIAL IN A CABLE TELEVISION SYSTEM", previously incorporated herein by reference in its entirety. Advantageously, no SDV server code changes are needed for the exemplary embodiments of the invention to function. However, it will be appreciated that future variants may requires such changes to support various enhanced functionalities (e.g., opportunistic content insertion of the type described in co-owned and co-pending U.S. patent application Ser. No. 11/291,328 filed Nov. 30, 2005 and entitled "APPARATUS AND METHODS FOR UTILIZING VARIABLE RATE PROGRAM STREAMS IN A NETWORK", which is incorporated herein by reference in its entirety.

The gateway device 204 of the illustrated embodiment is utilized to pass content to the CPE 107. In one embodiment, the gateway device 204 includes a cable modem which complies with the DOCSIS 3.0 standard, as discussed in "*DOCSIS® 3.0 Management Features Differences Technical Report*" CM-TR-MGMTv3.0-DIFF-V01-071228 and "*DOCSIS 3.0 OSSI Configuration Management Technical Report*" CM-TR-OSSIv3.0-CM-V01-080926, each of which is incorporated herein by reference in its entirety.

The gateway device 204 of the present embodiment is not considered a "video gateway" of the type commonly known in the industry, but rather is purposely designed to be "thin" in terms of its capabilities. Specifically, the gateway 204 advantageously does not require video processing, decryption functionality, or link protection functionality. Further, it is not required (and in some instances not desirable from a cost perspective) for the gateway 204 discussed herein to have a digital storage device (such as e.g., a hard drive) for sharing content among users in the home, nor does the gateway 204 discussed herein include transcoding, transrating, and down-resolution (or alternatively up-conversion) capabilities. However, it is appreciated that while the above-disclosed functionality is discussed as not being necessary in the exemplary embodiment of the gateway 204, the invention may readily be practiced with a gateway device which includes one or more the aforementioned capabilities if desired.

A typical modem tuner only allows viewing certain channels within a range. In other words, a typical tuner is restricted on the how far away in the frequency domain that a QAM channel can be from another QAM channel, and still tune to both simultaneously. The exemplary methods discussed herein utilize SDV/BSA delivery mechanisms to provide content; however, these delivery mechanisms are not configured to ensure requested programming is placed on contiguous QAM channels, and instead assign programs to any available QAM. This somewhat "randomized" (assignment protocol may cause difficulties for a tuner attempting to tune to multiple non-proximate frequencies, since the QAM channels allocated to the SDV/BSA service are often separated in frequency by an amount greater than the tuners simultaneous tuning range limitation. Hence, in one embodiment of the present invention, the gateway 204 may include a wide band tuner, such as that discussed in co-owned, co-pending U.S. Patent Application Publication No. 20060130113 entitled "Method and Apparatus for Wideband Distribution of Content" and filed Dec. 14, 2010, incorporated herein by reference in its entirety. Additionally, various manufacturers have developed cable modem tuners that are capable of tuning across larger portions of the available QAM spectrum and/or while are independent agile; these enhanced cable modem tuners may be used in the gateway device 204 as well to avoid the foregoing difficulties. In one implementation, the gateway device 204 may utilize more than one "individually agile" tuner, such as those developed by e.g., Microtune Corp. or SCM Microsystems. These individually agile tuners are capable of tuning any single QAM carrier anywhere in the CATV forward passband (i.e. 54-1002 MHz). For example, the Microtune MT2170 tuner IC supports 96 MHz of bandwidth, or 16 (sixteen) 6-MHz channels, as does Broadcom's BCM3382 device. It is further expected that greater channel widths will be available in future tuner ICs.

It is further appreciated that different classes of devices and, and thus levels of service, may be provided by increasing or decreasing the number of individually agile tuners, and/or the use of different types of tuners.

The legacy CPE 106 of the embodiment of FIG. 2a is of the type well known in the art. As discussed above, the legacy CPE 106 is not capable of decoding IP packetized content, but rather only demodulating, decrypting, and extracting elemental streams delivered over an e.g., MPEG-2 single- or multi-program transport. Hence, the legacy CPE 106 where present merely receives in-band, non-IP content as discussed above with respect to FIGS. 1-1c. The present invention contemplates that premises may be configured according to one of the three foregoing forms (i.e., legacy only, mixed IP and legacy, and IP only), although other configurations are possible.

In contrast, the IP-capable CPE 107 may comprise any device capable of receiving and decoding IP packetized content, whether for display thereon, or for recording, display, or storage on a device in communication therewith. Exemplary devices include IP-enabled settop boxes, IP-enabled television sets, laptop and desktop computers, and even cellular smartphones, personal media devices (PMD), etc. In one preferred embodiment, the IP-capable CPE 107 is compatible with Digital Living Network Alliance (DLNA) standards for consumer electronics (such as those discussed in DLNA Interoperability Guidelines, version 1.5, published March 2006 (expanded October 2006), which is incorporated herein by reference in its entirety) for signaling purposes, and also makes use of a digital rights management (DRM) content protection scheme to comply with limitations on certain content, or provide authorization credentials with respect to protected content.

Referring back to the embodiment of FIG. 2a, the channel list server 202 is a network headend 150 entity which provides information regarding available IP packetized content to the IP-enabled device 107. The information includes e.g., a program guide, a description of available IP programs, and channels for the programs. In one embodiment, these may be presented to the user in the form of an electronic program guide (EPG).

The channel list server 202 may further be responsible for providing a look-up table or similar data structure to the gateway device 204, which the device 204 downloads and stores or caches locally. The look-up table enables the gateway device 204 to associate a source identifier (source ID) for programs requested by the IP-enabled CPE 107. Here, the source ID is used to uniquely identify different programs (or renderings of the same program, such as an MPEG-2 version versus an MPEG-4 version). Alternatively, the look-up table may be provided via another entity of the network headend 150, such as an application server; e.g., the exemplary Mystro Application (MAS) referenced elsewhere herein.

A method for the delivery of IP packetized content using the exemplary architecture of FIG. 2a will be discussed in greater detail below.

It will be recognized that while the embodiment of FIG. 2a illustrates a single IP-enabled CPE 107 at a given premises, the present invention further contemplates the case where multiple heterogeneous or homogenous IP-enabled devices are used at the same premises. For instance, a given home or business might have two or more IP-enabled STBs in communication with the gateway 204, the latter including tuning capacity (e.g., multiple tuners, and/or a wideband tuner capable of receiving multiple QAMs simultaneously) and encapsulation, etc. support to enable providing two or more different IP-encapsulated streams to the respective IP-enabled CPE. This may be accomplished by, e.g., providing the multiple streams with respective (different) multicast addresses to which each IP-enabled device may access in order to receive the desired stream. In the event that two (or more) of the CPE want to watch the same program stream, they can simply access the same multicast address within the premises. Hence, a single gateway can advantageously service IP-enabled CPE 107 in multiple rooms or regions of the premises, each being able to receive the same or a different program stream. Moreover, the devices may be heterogeneous or mixed (e.g., on IP-enabled device is an STB, one is a PC, one is a mobile wireless device, etc.), so that different use models and wired/wireless interfaces can be simultaneously supported for the same premises.

In another variant, the gateway 204 can be configured to use one tuner and associated digital processing chain to receive and encapsulate a first stream destined for one multicast address (and associated CPE 107), while using a second tuner to receive an already IP-encapsulated stream, such as via a normal DOCSIS QAM or the like. Hence, the gateway can act as a hybrid "switched" ITTV/non-switched IP device for multiple CPE in the premises.

Figure 2B:
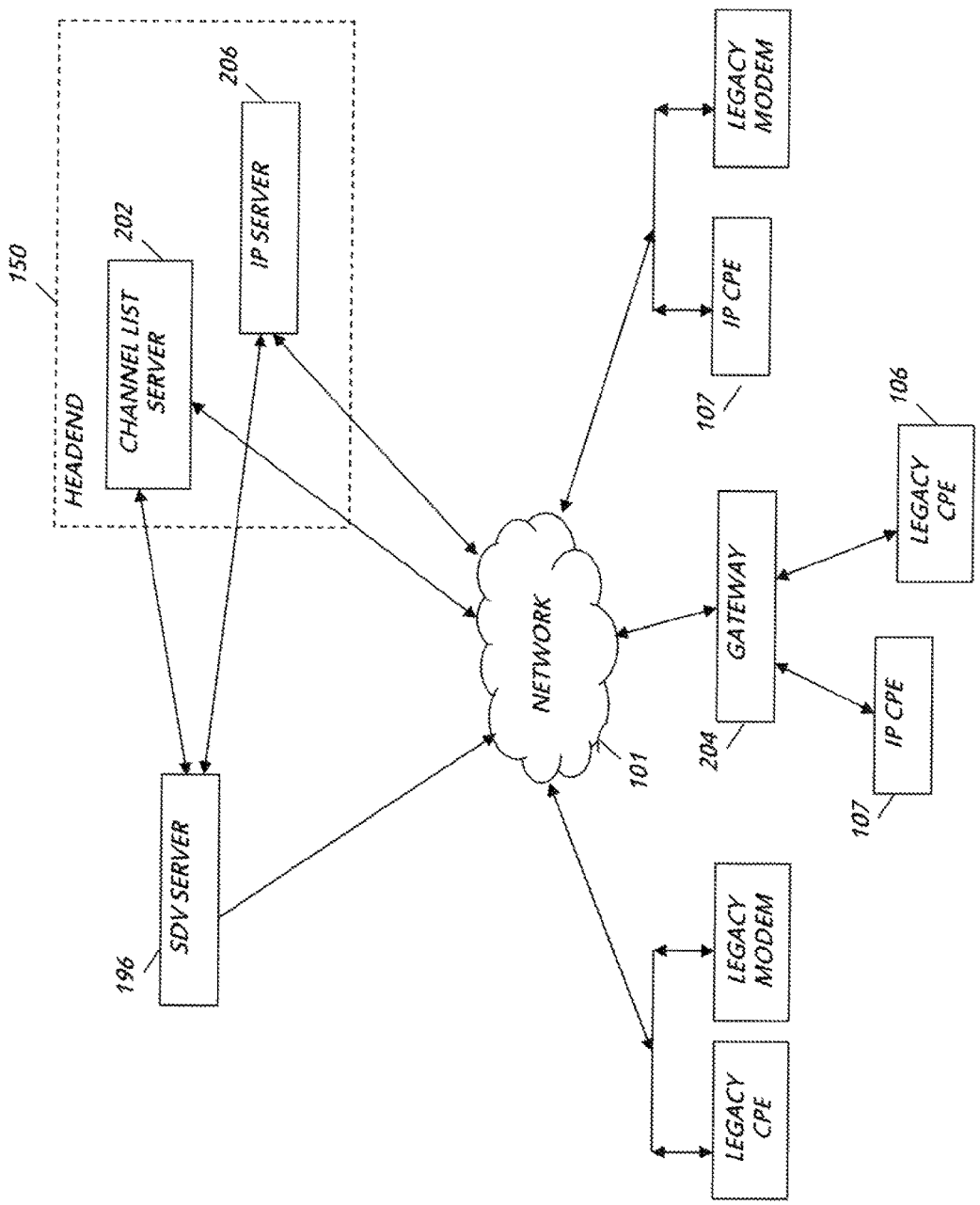
FIG. 2b is a functional block diagram illustrating a content delivery network architecture configured in accordance with a second embodiment of the present invention.

Referring now to FIG. 2*b*, another exemplary architecture for the delivery of packetized (such as IP packetized) content is illustrated. As shown, the embodiment of FIG. 2*b* generally comprises a headend IP server 206 in communication with the IP CPE 107 via a gateway device 204.

In the embodiment of FIG. 2*b*, the gateway device 204 does not perform the JP encapsulation as in the embodiment of FIG. 2*a*. Rather, the headend IP server 206 is utilized to perform these processing steps. In this manner, the gateway device 204 can be made even "thinner", providing modem capabilities for the legacy CPE 106 and IP CPE 107 in communication therewith. In another embodiment, the gateway device 204 may be obviated in favor of cable modem capabilities at the CPE 107 themselves (i.e., all functionality can be integrated into the IP STB).

According to the embodiment of FIG. 2*b*, the IP CPE 107 receives program information from the channel list server 202, and a user of the IP CPE 107 selects content from the program information for viewing. A content request indicating the user's selection may be passed directly to the IP proxy server 206, or may be passed via a DLNA request to the gateway 204 (if present), which is then transmitted to the SDV/BSA server/resource manager via IP over DOCSIS transport.

Upon a user request for content, the SDV server 196 determines whether the requested content is already provided in the current MPTS, and if not switches in the IP encapsulated stream. Once the content is made available, the SDV server 196 transmits a message to the gateway 204 (or directly to the IP CPE 107 where no gateway is present) indicating the appropriate "tuning triplet"—TSID, modulation type, and program number. Alternately, the gateway may read (and optionally cache) the mini-carousel (or an enhanced version of thereof) and acquire the timing triplet without needing to receive a message from the SDV server/resource manager, and thereby allow IPTV tuning of content even in the case where no upstream messaging connectivity is present.

The architectures discussed herein (e.g., FIGS. 2*a* and 2*b*) advantageously allow for free intermixing of MPEG-4 and MPEG-2 encoded streams. Specifically, the SDV server 196 can switch in or out both types of content for delivery across the network. The SDV server 196 is never made aware of the payload type (e.g., MPEG-2 or MPEG-4) for requested content, thereby making switched delivery match user requests without having to have knowledge of what type of content it is carrying. Moreover, there is no predetermined ratio of MPEG-4 to MPEG-2 content in the present system; the mix can literally range from all one type of content to all of the other within the same service group.

Further, the SDV server 196 in the exemplary embodiments is not aware of the functionality of the gateway device 204; rather, the gateway 204 appears to the SDV server 196 as any other legacy CPE 106 would.

It is also appreciated that the full suite of SDV protocol capabilities (fail to tune reporting, channel not available message call-out, "are you still there" etc.) are supported by the above described gateway 204 and/or headend IP proxy server 206 devices for use in communicating between these devices and the SDV server 196.

As will be discussed in greater detail below, in one embodiment of the invention, certain MPEG-2 content may be provided to users "in the clear", i.e., the content is not protected or PowerKey encrypted. Rather, PEG (public, education, and government), emergency, and similar content is provided as off-air broadcast content. The off-air PEG content is provided without use of the SDV server 196, and rather is "always on" by nature. This content is made available to IP CPE 107 via the gateway 204 which, once it realizes the request is for content which is running in the clear (i.e., is not encrypted or protected), tunes to the appropriate QAM, extracts the elementary stream(s) from the relevant transport, applies an IP wrapper (i.e., encapsulates the extracted content within an IP packets), assigns a multicast address, and exposes this multicast address to the premises network (collectively referred to herein as "protocol translation"). IP CPE 107 on the premises network can then recognize the multicast address, and decode the content using its MPEG-4 decoder (which in the exemplary embodiments is also capable of decoding MPEG-2 encoded content). The architecture of FIGS. 2*a* and 2*b* therefore enables the delivery of in-the-clear content without requiring the SDV server 196 to manage, or the router to carry, these QAM signals. Stated simply, one embodiment of the invention "switches if not clear", and "does not switch if clear". This approach has the advantage of unloading these PEG and similar channels from the SDV server's or the resource manager's/limited QAM resource with no bandwidth penalty or other deleterious effects.

As previously noted, IP-enabled CPE 107 can, in certain embodiments of the invention, view some video even when the reverse plant connection is lost. Specifically, the gateway may read (and optionally cache) the mini-carousel (or a future enhanced version thereof) and acquire the tuning triplet associated with a given program, without needing to receive a message from the SDV server or resource manager. Hence, IPTV tuning of content may occur even in the case where no upstream messaging connectivity is present. Since the IP CPE 107 will have downloaded the list of programs, it has enough information to request (and the gateway has enough information to locate) those programs that are either 1) already switched in, or 2) "on all the time" broadcasts.

Moreover, in another variant, H.264/MPEG-4 clear or DRM-encrypted programs are included on broadcast QAMs that are "on all the time" In order to achieve the aforementioned functionality.

Methodology—

Figure 3:
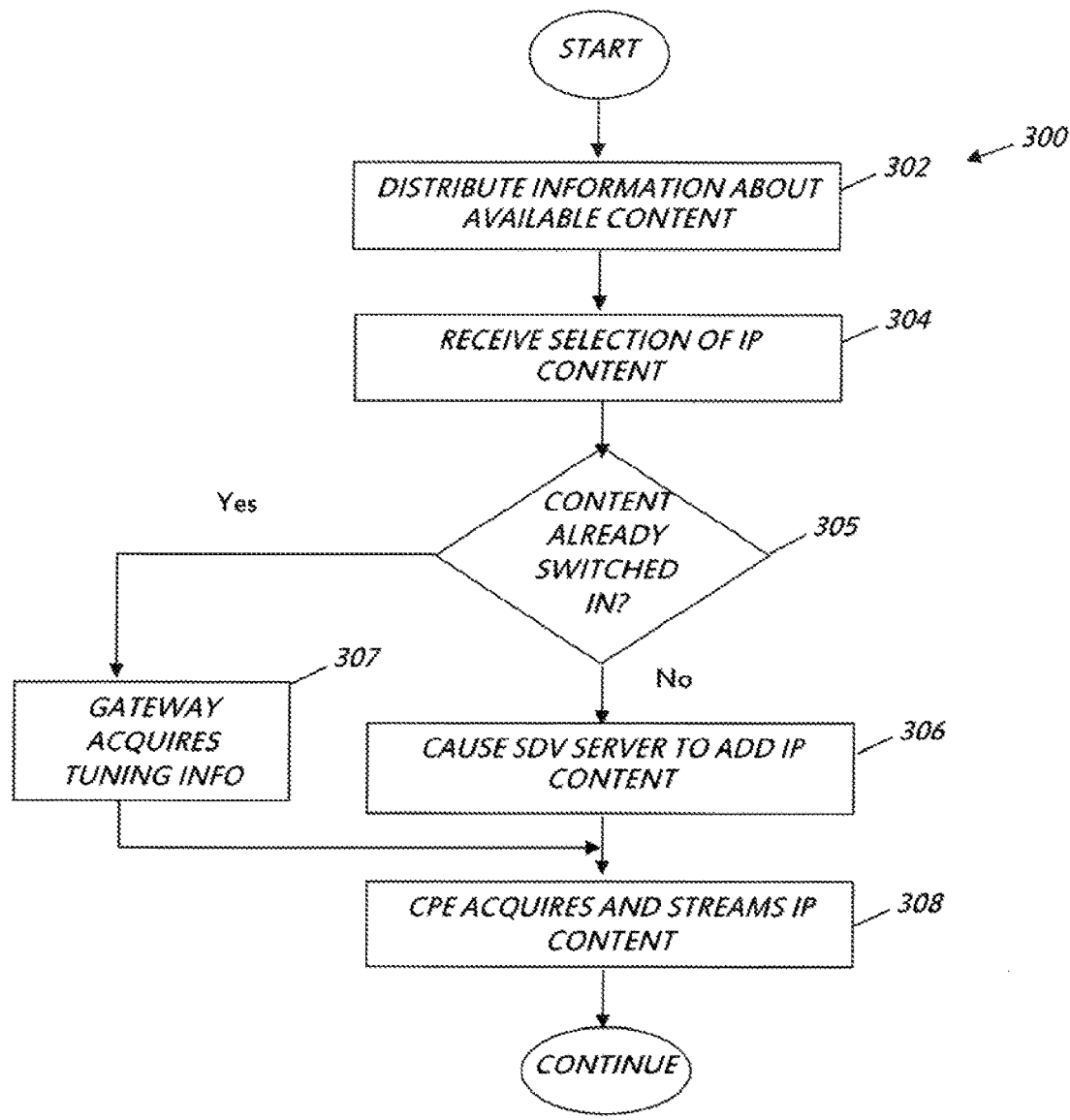
FIG. 3 is a logical flow diagram illustrating an exemplary generalized method for providing packetized content delivery according to the present invention.

Referring now to FIG. 3, an exemplary generalized method 300 for providing IP packetized content delivery according to the present invention is illustrated. As shown, per step 302, information regarding the available content is distributed to the IP-capable 107. As noted previously this information may include e.g., a program guide, program descriptions, and channel information for the available programs. Information regarding the available content is also distributed to a gateway device 204 in one embodiment. The information passed to the gateway 204 may include e.g., a source ID for each of the available programs, but is otherwise similar to the information passed to the CPE 107.

The channel maps may be delivered to the gateway 204 and CPE 107 over DOCSIS. In one embodiment, an application server, such as the Mystro Application Server (MAS) 205 device of Assignee hereof discussed in co-owned, co-pending U.S. patent application Ser. No. 11/263,015 filed Oct. 2, 2002 and entitled "NETWORK BASED DIGITAL INFORMATION AND ENTERTAINMENT STORAGE AND DELIVERY SYSTEM", now published as U.S. Patent Application Publication No. 2003/0208767, incorporated herein by reference in its entirety, provides information utilized to generate the channel list (or channel map) at the channel list server 202. Alternatively, the system information table may be utilized as provided to the list server 202 from the digital network controller system (DNCS). It is further appreciated that the channel list server 202 may comprise an entity or functionality of either the MAS server or the DNCS. In one embodiment, the channel list or map does not include a tune frequency table; rather the source ID is used to request a program, and the source ID is included in the gateway's program select message to the SDV server/resource manager. The channel list correlates the program name, multicast address and/or source ID which are used to make a request to the SDV server 196.

Next, at step 304, a selection of particular content is received from the IP-capable CPE 107 at a proxy or intermediary device (such as a gateway device 204 and/or a headend IP server 206). In one embodiment, the IP CPE 107 may transmit this request using the aforementioned DLNA protocol to the gateway device 204. Alternatively, the IP CPE 107 may transmit the request directly to a network server 206.

At step 305, the SDV server 196 determines whether the requested content is already being made available, and if not adds the requested content to the MPTS of available content per step 306. The process by which the SDV server 196 performs these functions is discussed above with respect to FIG. 1c. In one embodiment, co-owned and co-pending U.S. patent application Ser. No. 09/956,688 and entitled "TECHNIQUE FOR EFFECTIVELY PROVIDING PROGRAM MATERIAL IN A CABLE TELEVISION SYSTEM", previously incorporated herein, may be used to provide an exemplary switched digital architecture consistent with the present invention.

The IP CPE 107 may then acquire and stream the requested content (step 308). In the case that the IP CPE 107 selects content which is already being viewed by another user (LP-enabled), then the gateway 204 obtains the tuning information for that existing stream, and tunes to it and processes the stream (i.e., encapsulates it in an IP wrapper, etc.), and exposes the multicast address on its ports for the CPE to acquire.

In the case where the CPE 107 selects non-IP (e.g., legacy MPEG-2) content for delivery, the gateway will have already acquired tuning information for these types of streams; they may also include MPEG-4 and possibly DRM-encrypted content. In that such streams are "on all the time" and as such, are constantly flowing in a broadcast QAM, they do not consume SDV edge QAM resource space.

In that the exemplary embodiment of the gateway 204 herein has no conditional access capability, the elementary streams associated with the legacy-encrypted content cannot be decrypted by the gateway, but streams that are "in the clear" may still be tuned, demultiplexed, wrapped with IP, and exposed on the home network as described subsequently herein with respect to FIG. 6.

It is also noted that the EPG or content listing for the IP CPE 107 may also be structured so that only IP-enabled streams (e.g., MPEG-4/DRM) are selectable by the IP CPE, so as to avoid having to implement the foregoing logic. While the EPG can be used as a mechanism to display a subset of available programs based on various constraints, the CPE advantageously does not need to know the format of carriage in advance of the request; the gateway 204 provides this functionality. This does not however obviate having to carry both streams in the case that both legacy and IP-enabled users wish to view the same program at the same time.

In terms of net bandwidth consumption, it is again noted that since say (anecdotally) 7 of 10 (as one example) of newly added streams will have only one, the instances where both legacy and IP streams must be delivered are small, and at least offset by gains in encoding efficiency (i.e., an MPEG-4/H.264 encoded stream consumes roughly half the bandwidth of an MPEG-2 encoded stream), thereby providing a net zero change in terms of bandwidth. This property also advantageously relieves the SDV system from having to be cognizant of the mix or proportion of the two types of streams for purposes of bandwidth management; the SDV system merely treats them both the same, and freely intermixes with no penalty or deleterious effects on bandwidth consumption.

It is noted that while the aforementioned discussion refers to streams having only one viewer, these streams are technically not "unicast", but rather multicast so that a second (or additional) viewer can join at any time. Moreover, while e.g., 7 of 10 streams have only one viewer, significantly fewer than 7 of 10 requests are for streams that will ultimately have only one viewer, because multiple requests are received for streams that are already flowing.

Figure 4:
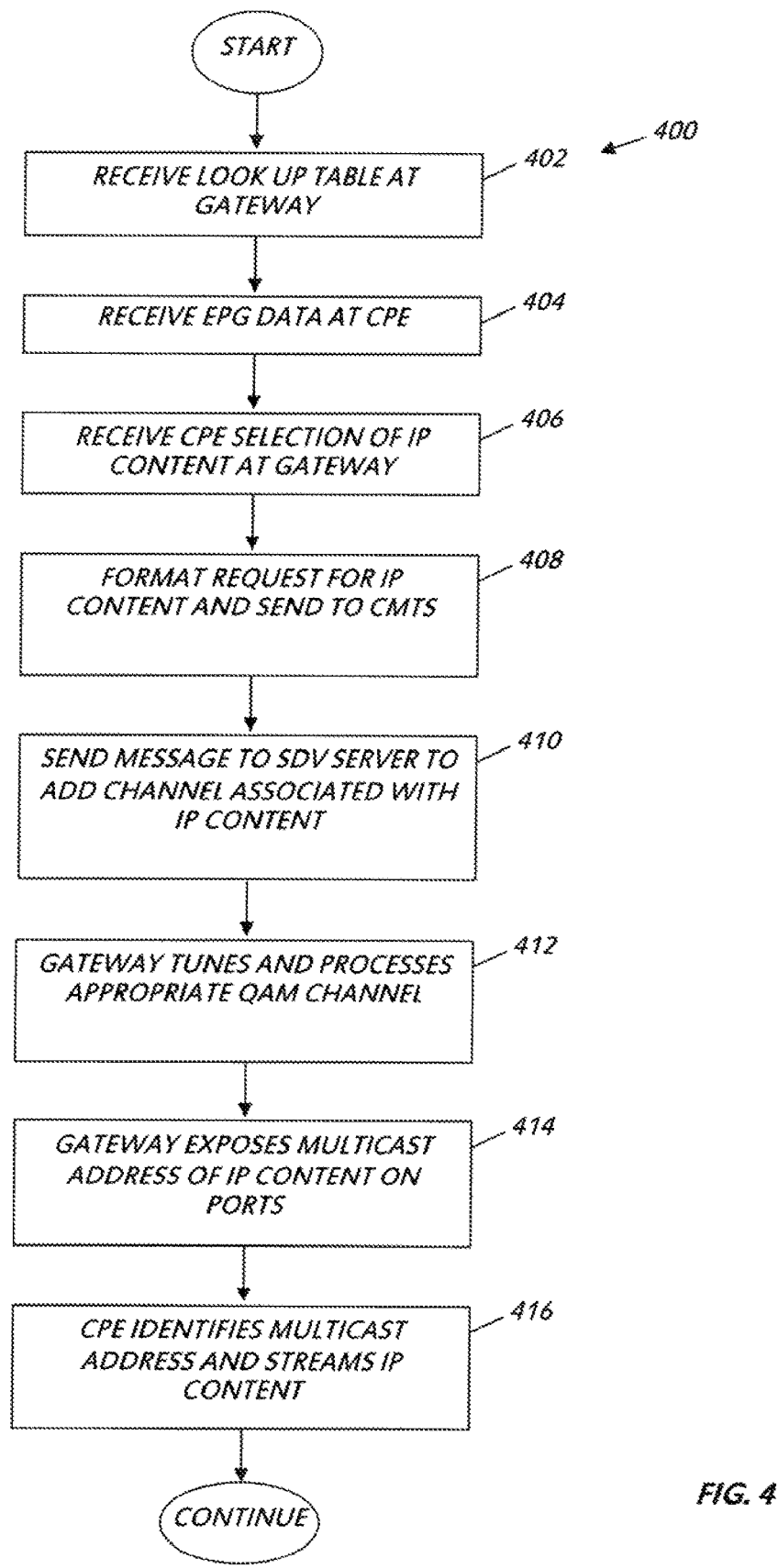
FIG. 4 is a logical flow diagram illustrating a first exemplary implementation of the method of FIG. 3.

FIG. 4 is a logical flow diagram illustrating a first exemplary implementation of the method of FIG. 3. At step 402 of the method 400, a look-up table is received at the gateway device 204. The look-up table provides the gateway device with source ID for each of the available programs. It may be provided to the gateway from the channel list server 202, or from another entity either directly, or via the CMTS 199.

At step 404, EPG data is received at the CPE 107. The EPG data describes the available content including program titles, channels, descriptions, etc. In one embodiment the IP CPE 107 runs a media player (such as e.g., Microsoft Mediaplayer®, RealPlayer®, QuickTime®, etc.). The media player implements DRM, and requests and receives the EPG (or other program information) from the channel list server 202.

A user of the CPE 107 may review the EPG data and select content for delivery. In the instance of IP content, the user is a user of an IP enabled CPE 107 and the selected content comprises IP packetized content. At step 406, the user's selection is passed from the CPE 107 to the gateway device 204. In one embodiment, the IP CPE 107 uses an enhanced or updated DLNA protocol which allows the CPE 107 to make channel change requests to other devices and systems (in this case the gateway device 204). The IP CPE 107 signals the content request, which includes an identifier of the content and channel which the requested content is on (as obtained from the EPG), into the home network. The gateway device 204 via DLNA "hears" the content request from the IP CPE 107. In one implementation, the gateway device 204 implements firmware code in order to provide this DLNA functionality, although other approaches may be used.

Next, at step 408, the gateway device 204 formats the request so that it may be sent via the CMTS 199 to the SDV server. The gateway 204 uses the previously referenced look-up table to identify the source ID for the requested channel. A protocol specific to the SDV server 196 is also implemented by the gateway device 204. The SDV protocol is used, at step 410, to send the request message to the SDV server 196. In response to the message, the SDV server 196 will add the requested program to a multi-program transport stream (MPTS) if the content is not already currently being provided, and stream the MPTS over one or more QAMs. The SDV server 196 notifies the gateway device 204 of the QAM on which the requested program was added, and of the program identity (program ID).

Per step 412, the gateway device 204 tunes and processes the appropriate QAM channel(s). The gateway 204, via its modem, demodulates the MPTS. To demodulate the stream, the modem examines the program access table (PAT) and the program mapping table (PMT) to obtain information needed to extract the elementary streams relating to the requested program. The elementary streams may include e.g., the video stream, audio stream, enhanced TV binary interchange format (EBIF) streams, emergency alert system (EAS) data, and other data streams.

The gateway device 204 encapsulates the extracted content using e.g., the IP protocol, and appends the JP headers of the encapsulated elementary streams to include a multicast address. In this mariner, the gateway device 204 is able to process the IP content without requiring any additional decoding or conditional access components. Rather, the gateway 204 encapsulates and appends the IP header with the multicast address without being aware of the payload of the elementary streams. The gateway 204 then exposes the multicast address of the IP content to all ports on its router, thereby indicating that the address is now available for streaming (step 414).

At the time the IP CPE 107 requests the content, it begins "listening" on the premises network for the multicast address. Thus, when the gateway 204 exposes the address on its ports, the IP CPE 107 identifies the multicast address, and streams the IP content (step 416). The IP CPE 107 loads the packets, processes the content (including using the DRM to decrypt, buffering the packets, reordering as required, and clock recovery, etc.), and displays or passes the content for display on a separate device.

Figure 5:
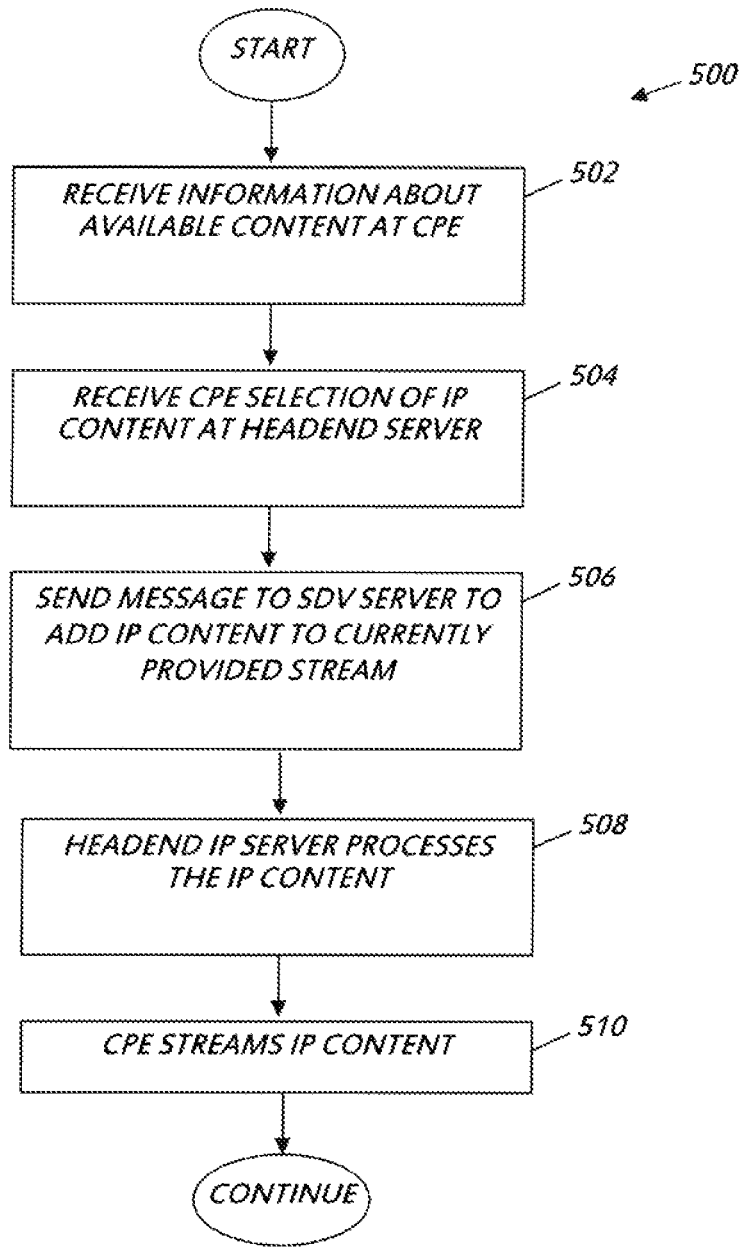
FIG. 5 is a logical flow diagram illustrating a second exemplary implementation of the method of FIG. 3.

FIG. 5 is a logical flow diagram illustrating a second exemplary implementation of the method of FIG. 3. At step 502 of the method 500, information regarding available content is received at IP CPE 107 from the channel list server 202. The information received at the IP CPE 107 includes information regarding IP content. In one embodiment, the information comprises an EPG, which displays program titles and descriptions to a user, and which associates each title or program to a unique program ID, multicast address or source ID.

When the user of the IP CPE 107 selects to receive content, a request is generated by the CPE 107 and transmitted to a headend IP server 206 (step 504). The IP server 206 formats the request to include a source ID of the requested program if the source ID is not already included. In one embodiment, a gateway device 204 may act as a proxy for receiving and formatting the request prior to sending it to the IP server 206.

At step 506, the headend IP proxy server 206 transmits a message to the SDV server 196 indicating that the SDV server 196 should add the requested content to a currently provided MPTS stream if not already present. If the requested stream is already present at the edge router, then the requested MPEG-4/DRM stream is added to the MPTS, and the tuning information sent to the CPE 107 or gateway 204.

In one embodiment, as discussed above with respect to FIG. 2b, the IP CPE 107 has its own tuner or cable modem and does not need to be in communication with a gateway device 204. The IP CPE 107 in this embodiment tunes to the appropriate QAM, and begins processing and streaming the appropriate content (based on the multicast address) at step 510. Alternatively, a gateway 204 may be utilized to provide cable modem functionality for connected IP CPE 107 devices. According to this embodiment, the gateway 204 demodulates the appropriate QAM, the connected IP CPE 107 may then identify the exposed multicast address and begin streaming the requested IP content (step 510).

In another embodiment, the requested content may be transmitted directly from the IP server 206 to the IP CPE 107 using TCP/IP or other secure form of content transmission; e.g., via CMTS channels and DOCSIS QAMs. The same IP CPE 107 used for the invention can also view "native" IP content via CMTS-controlled delivery.

"Clear" Content Delivery—

Figure 6:
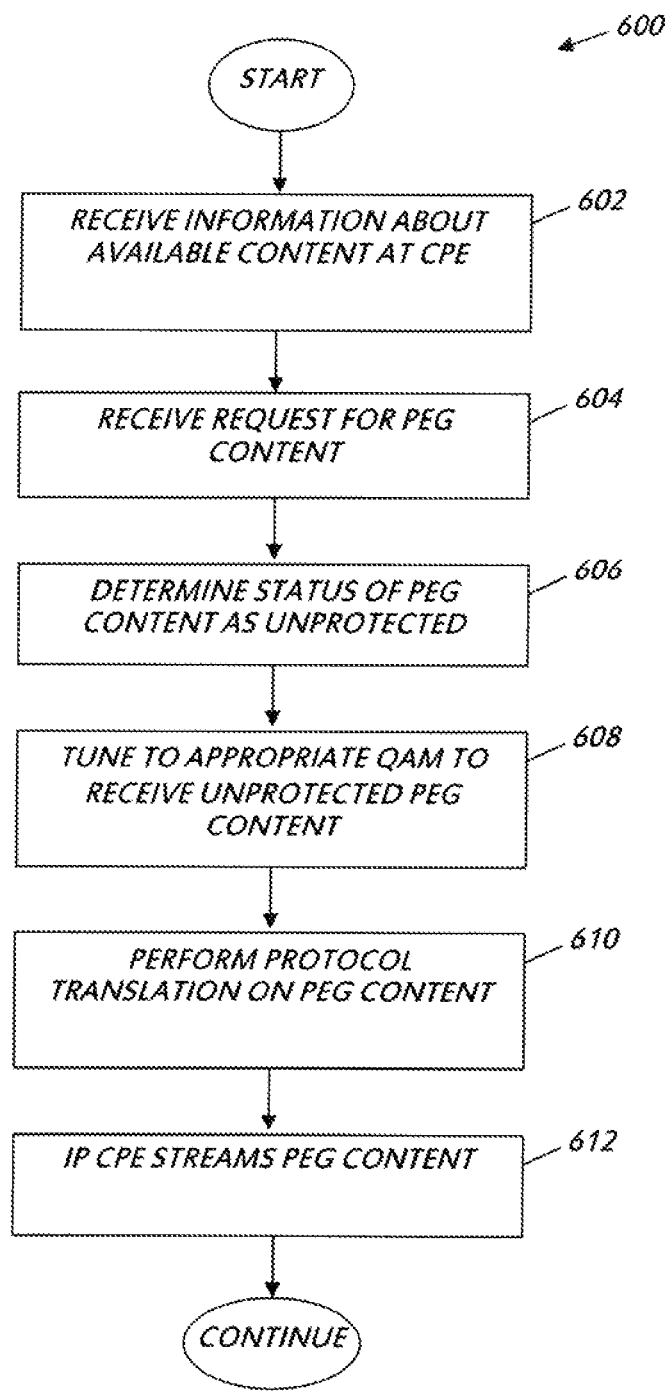
FIG. 6 is a logical flow diagram illustrating an exemplary method for providing public, educational and government (PEG) content to an IP capable device according to one embodiment of the invention.

Referring now to FIG. 6, an exemplary embodiment of the method for providing unprotected or =encrypted content (such as public, educational and government (PEG) content) to an IP capable CPE 107 according to the present invention is illustrated.

As shown, per step 602 of the method 600, information regarding available content is received at the IP CPE 107 from the channel list server 202. Among the available content is PEG content. PEG content is generally run in the clear, i.e., is not protected and is broadcast "off the air" and is generally MPEG-2 encoded.

At step 604, the user of the IP CPE 107 selects PEG content, and a request for the content is transmitted to the gateway device 204, or the headend IP server 206 (including via the gateway device 204). The content request includes a unique identifier of the requested content (such as source ID, program title, etc.). The gateway 204 and/or IP server 206 evaluates the request, and determines the status of the requested content as unprotected, PEG content (step 606).

Since the requested content is not protected and is "always on", there is no need for the gateway device 204 and/or the IP server 206 to request that the content be added by the SDV server 196. Rather, per step 608, the gateway 204 (or CPE 107 if so equipped) tunes to the appropriate QAM to receive the unprotected PEG content as part of an SPTS or MPTS.

The gateway 204 and/or headend IP server 206 performs protocol translation on the PEG content so as to encapsulate it and apply an IP header for transmission to the IP CPE 107 (step 610). The IP CPE 107 of the present embodiment is backward-compatible, in that it is capable of decoding both MPEG-2 and MPEG-4 content (in fact, effectively all MPEG-4 decoders are also capable of MPEG-2 decoding). Accordingly, at step 612, IP CPE 107 is able to stream and decode the MPEG-2 encoded PEG content. Not that no decryption or DRM is required, since the content is not protected.

The method of FIG. 6 thereby off-loads the responsibility for carrying in the clear content from the switch system (SDV server 196). In other words, the SDV server 196 does not need to utilize QAM capacity to handle PEG and other in-the-clear content; they are instead never switched in or out, but instead always on.

Furthermore, any DLNA capable device in the user premises may access PEG content from the gateway 204 without headend intervention.

In sum, using the herein described methods (see FIGS. 3-6 and discussions above), when a IP-enabled user device sends a channel number request, one of the following may occur (either at the gateway 204 or at the headend server 206, depending on configuration):

1) If the requested channel is MPEG-2 "in the clear" content, the gateway tunes to the broadcast QAM, parses the program number packets, wraps these in IP (performs protocol translation), and routes these to the requesting device (e.g., IP CPE 107), for decoding by the MPEG-2 capable decoder of the device. The gateway may then optionally send an SDV_Program_Select_Request message (that is not-to-be confirmed) to the SDV server 196 for viewership record-keeping purposes.

2) If the requested channel is currently provided via the SDV server 196 (i.e., is shown in the mini-carousel) and is in a form that the requesting device can use, the gateway tunes to the SDV QAM, parses the program number packets, wraps these in IP, and routes these to the requesting device (e.g., IP CPE 107) for decryption using its DRM suite, and decoding using its MPEG-4 decoder. The modem then sends an SDV_Program_Select_Request message (that is not-to-be confirmed) to the SDV server 196 for record-keeping purposes.

3) If the requested channel is available for SDV delivery, but not currently provided (i.e., is not listed in the mini-carousel), a (network-facing) SDV protocol message (the SDV_Program_Select_Request message) is sent to the SDV server 196 with the "client capabilities descriptor" bytes (supported MPEG type(s), DRM/CA types, etc.) appropriately set. In one embodiment, these may be default values for all IP-enabled CPE 107, or may be obtained during the TA initialization sequence (discussed above). The SDV server 196 responds with an "SDV_Program_Select_Confirm" message to the modem's address, and switches the program in for delivery. The modem uses this tuning information to tune the QAM, parse the packets based on program number, wrap them in IP, and send them to the requesting device.

4) Requests from non-IP enabled user devices (i.e., legacy devices) are serviced via the legacy CPE 106 or cable modem via well-known methods (e.g., MPEG-2 and PowerKey).

Gateway Device—

Figure 7:
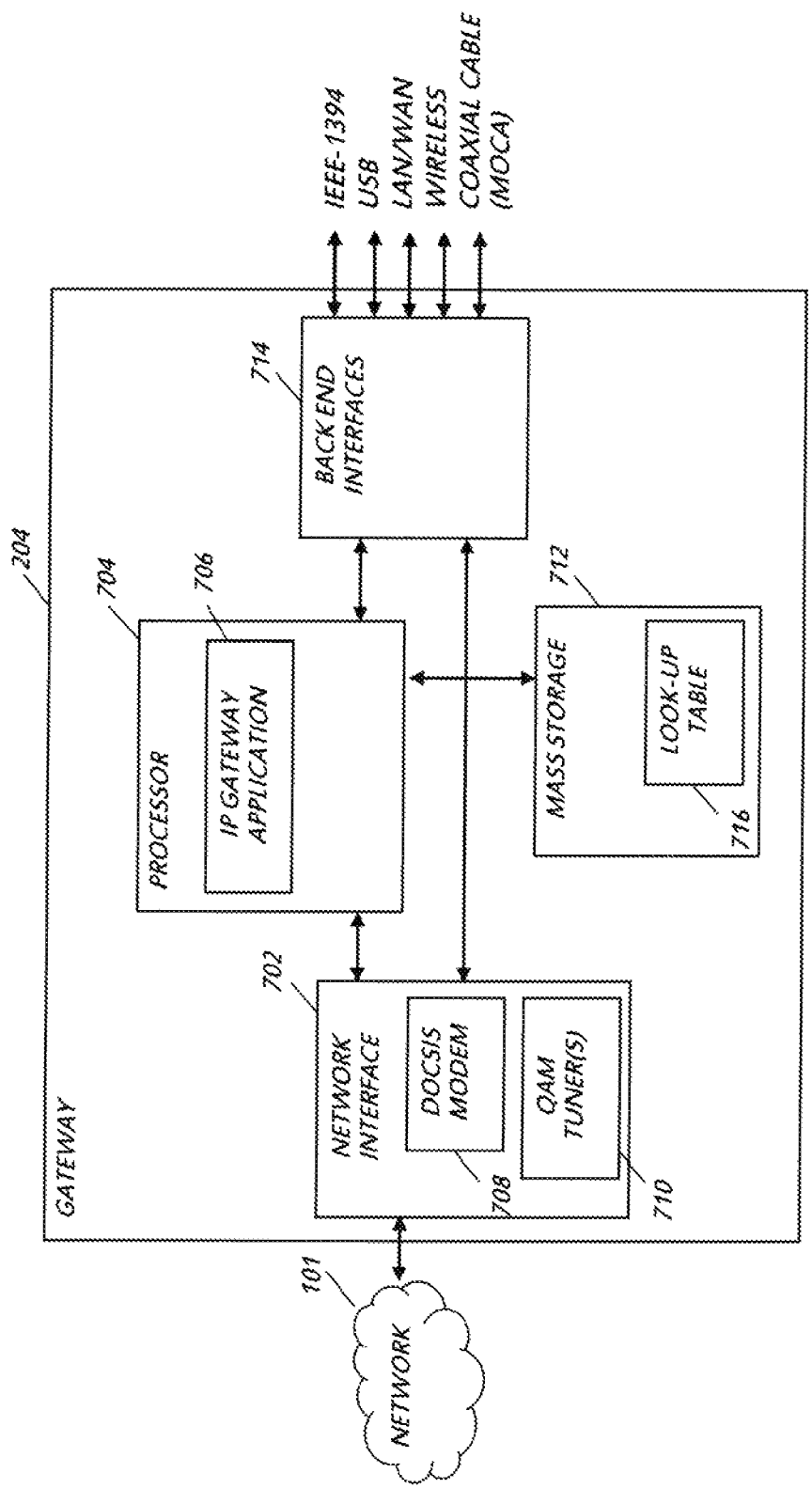
FIG. 7 is a functional block diagram illustrating one embodiment of a gateway device for use in delivering IP packetized content to a subscriber according to the present invention.

Referring now to FIG. 7, one exemplary embodiment of the gateway device 204 is illustrated. As shown, the gateway device 204 comprises a network interface 702, processor 704, mass storage 712 and backend interfaces 714.

As previously noted, the exemplary embodiment of the gateway 204 is purposely "thin", thereby reducing its cost and complexity. When compared with typical prior art video gateway solutions, the gateway of FIG. 7 is much lower cost, thereby enabling lower per-installation costs to the MSO when providing IP-enabled television services to its subscribers.

The gateway 204 includes a small amount of cache (to cache a channel list, a mini carousel list, and client initialization parameters for each connected CPE 106, 107), the ability to translate between the Tuning Adaptor (TA) protocol and the network-facing switched digital video (SDV) protocol, and a small amount of logic (e.g., "if request is not on list A, perform action B, etc."), as well as the ability to parse packets from the multiplex, apply an IP wrapper, and correctly route the outbound stream. Each of these functions, as well as the necessary components for accomplishing these functions, will be discussed subsequently herein.

The network interface 702 comprises at least a cable modem 708, such as e.g., a DOCSIS 3.0 compliant cable modem of the type discussed in "*DOCSIS® 3.0 Management Features Differences Technical Report*" CM-TR-MG-MTv3.0-DIFF-V01-071228 and "*DOCSIS 3.0 OSSI Configuration Management Technical Report*" CM-TR-OSSIv3.0-CM-V01-080926, each of which is incorporated herein by reference in its entirety.

The cable modem 708 provides DOCSIS connectivity to the CPE 107 to be used for communication with the SDV server via the CMTS as previously described, as well as various other purposes (such as VOD, Internet "surfing", interactive program guide (IPG) operation, etc.). However, in one embodiment, an alternate messaging method is used to allow the IP CPE 107 to message the SDV server 196 through a headend proxy (such as the headend IP proxy server 206), bypassing the gateway modem 708 for some of the protocol functions.

The gateway device 204 network interface 702 further comprises one or more QAM tuners 710 configured to receive content from an HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. The number and type of QAM tuners 710 utilized in the gateway device 204, as noted above, may be varied so as to ensure tuning across the entire available spectrum. Alternatively, different classes of devices may be provided each class having a different tuning range capability.

For example, the gateway 204 may include a wide band tuner, such as that discussed in previously referenced co-owned, co-pending U.S. Patent Application Publication No. 20060130113 entitled "Method and Apparatus for Wideband Distribution of Content" and filed Dec. 14, 2010. The wideband tuner arrangement enables the gateway 204 to receive content associated with one or more program streams distributed across two or more QAMs. Additionally, the RF tuner(s) may incorporate functionality to modulate, encrypt/multiplex as required, and transmit digital information for receipt by upstream entities such as the CMTS. The tuners 710 may additionally be capable of tuning across the entire band of QAM channels such as those developed by e.g., Texas Instruments and Broadcom. Still further, the tuners 710 may comprise one or more "individually agile" tuners as discussed above.

In one specific implementation, the gateway 204 has one "agile" tuner for each simultaneous IP stream consumed (such agility is needed for tuning the wide 16+ QAM SDV pool); i.e., 4 agile tuners for most premises, which can be shared with DOCSIS and VOD. Additional tuner(s) are also needed for DOCSIS data.

One or more of the QAM tuners 710 of the exemplary gateway device 204 are also configured to tune to existing linear broadcast QAM for MPEG-2 streams including so-called "in the clear" content, such as off-air broadcasters and PEG channels (discussed above).

The gateway device 204 can assume literally any discrete form factor, including those adapted for settop/desktop, hand-held, or wall-mounted use, or alternatively may be integrated in whole or part (e.g., on a common functional basis) with other devices (such as the IP CPE 107) if desired. Additionally, the gateway device 204 may include other elements and interfaces such as for example an interface for the HomePlug A/V standard which transmits digital data over power lines, WiFi capability, a PAN (e.g., 802.15), Bluetooth, or other short-range wireless interface for localized data communication, etc.

The gateway device 204 further includes at least an IP gateway application or stack 706 running on the processor 704 thereof. As previously noted, the gateway of the illustrated embodiment purposely does not comprise "video processing" per se (e.g., decoding, transcoding/transrating, or decryption), but rather only those functions necessary to extract and encapsulate the received content, and pass it on to the CPE 107, etc. Accordingly, it will be realized that while a processor 704 and software running thereon are shown, at least portions of the requisite functionality may be implemented in other types of hardware including e.g., FPGAs, logic ICs, etc.).

The IP gateway application 706 may, in one preferred embodiment, comprise software which is downloaded to the gateway device 204 from the headend 101. The IP gateway application 706 enables the encapsulation and other functionality disclosed above. For example, the IP gateway application 706 enables a request for content received from a CPE 107 to be formatted for transmission to the SDV server 196 (and/or the headend IP server 206), such as by performing a search within the look-up table 716 to find the source ID of requested content, and appending the request to include the source ID. In one embodiment, the look-up table 716 includes the same information as the channel list provided to the CPE 106, 107.

The gateway 204 may further be provided information as to which channels are broadcast, which are currently streaming via the SDV server 196, and which are offered by the SDV server 196, but not currently streaming. For the broadcast and currently streaming channels, the gateway 204 also knows the tuning parameters, as well as whether or not the channels are carried in a format (DRM, MPEG-2/4, etc.) that the requesting IP CPE 107 can use.

When communicating the content request to the SDV server 196 (and/or receiving content from the SDV server 196) the IP gateway application 706 may implement the a standard protocol, for example the standard eight-message SDV protocol developed and deployed by Assignee hereof.

The IP gateway application 706 further enables the gateway 204 to identify and parse requested packets from SDV MPTS QAM multiplexes, apply an IP wrapper to the parsed packets (including placing an IP header on the elementary streams of the requested content), and forward the wrapped packets to the requesting IP CPE 107 (including exposing the multicast address) as described above.

It is noted that the exemplary embodiment of gateway device 204 does not implement any conditional access or authentication (aside from the well-known and implemented DOCSIS mechanism); hence, the gateway 204 is not a security device (i.e., the gateway 204 is not a theft target). Instead, content is securely transmitted to the IP CPE 107 which implements security mechanisms (such as DRM) discussed elsewhere herein. This also advantageously makes the gateway simpler and less costly.

In one embodiment, the gateway application 706 implements a Tuning Adaptor (TA; also known as a "Timing Resolver" or "TR") protocol (or a protocol substantially similar thereto). The TA protocol may be of the type currently in use by e.g., as described in "OpenCable Specifications-Tuning Resolver Interface Specification—OC-SP-TRIF-I01-080130" issued Jan. 30, 2008, which is incorporated herein by reference in its entirety. The exemplary CableLabs TA protocol is "consumer-facing," in that the Tuning Adaptor is effectively a firewall by virtue of acting as a protocol translator. This allows the cable operator (MSO) to patch and update the SDV "network-facing" protocol independent of the TA protocol. Hence, the translation enables the MSO to adapt the TA protocol to IP content delivery.

The TA protocol uses a USB connection for the physical layer of messaging, and is carried on the Ethernet and/or MoCA physical link. However, rather than utilizing TA protocol for the delivery of a channel list to the IP CPE 107, DOCSIS connectivity is utilized in the exemplary embodiment of the present invention.

It is appreciated that for use in the present invention, the TA protocol may also be modified to implement a mechanism to request a channel, and to implement "human presence detection" and built-in viewership statistics gathering.

The mass storage 712 of the gateway device 204 may be further utilized for caching of the SDV mini-carousel data (for robust operation), and a capabilities table for each CPE 107.

The gateway device 204 in one embodiment comprises off-the-shelf DOCSIS modem hardware, and moreover can advantageously be re-purposed for data-only duty in the future if another mechanism is later implemented for providing IP content to the IP CPE 107. That is to say, gateway memory (such as for look-up table 716 cache) and processing (protocol translation, parsing and forwarding, IP wrapping) are within the capabilities of current DOCSIS 3.0 modems, hence no additional hardware configurations that would make the device incompatible for such prior art uses are necessary to practice the present invention.

Use of a DOCSIS modem with no hardware customization allows the gateway device 204 to be repurposed as a CMTS-driven "single-pipe" connection. This repurposing can be accomplished without a service call (e.g., "truck roll"), since the CPE 107 hardware connections are identical, and the code is downloadable.

In the illustrated embodiment, the gateway device 204 does not include any "video awareness" or associated processing. Video processing (e.g., decrypting, decoding, etc.) need not be performed by the gateway 204 for the purposes of the present invention. The gateway device 204 carries MPEG-4 DRM CA streams as data streams, and not as video. The data streams are assigned ordinary program numbers in the MPTS multiplexes, and carried on the SDV QAM, hence there are no QAM code changes necessary for the gateway 204 to carry the data streams. The gateway device 204 of the present invention is further configured to provide both DOCSIS and SDV video delivery simultaneously via separate tuners.

The back end interfaces 714 enable the gateway to connect to the IP CPE 107 and a premises network, thereby providing DOCSIS and connectivity to premises devices. Any one of a number of messaging standards may be utilized for communication between the gateway 204 and CPE 106, 107, for example, IEEE-1394, USB, LAN/WAN, wireless, coaxial cable, etc.

As discussed above with respect to FIG. 2*b*, in one embodiment, the gateway device 204 is even "thinner" than that described above. Specifically, the gateway device 204 in this case may have limited functionality in favor of some functionality occurring at e.g., a headend IP proxy server 206.

IP Server—

Figure 8:
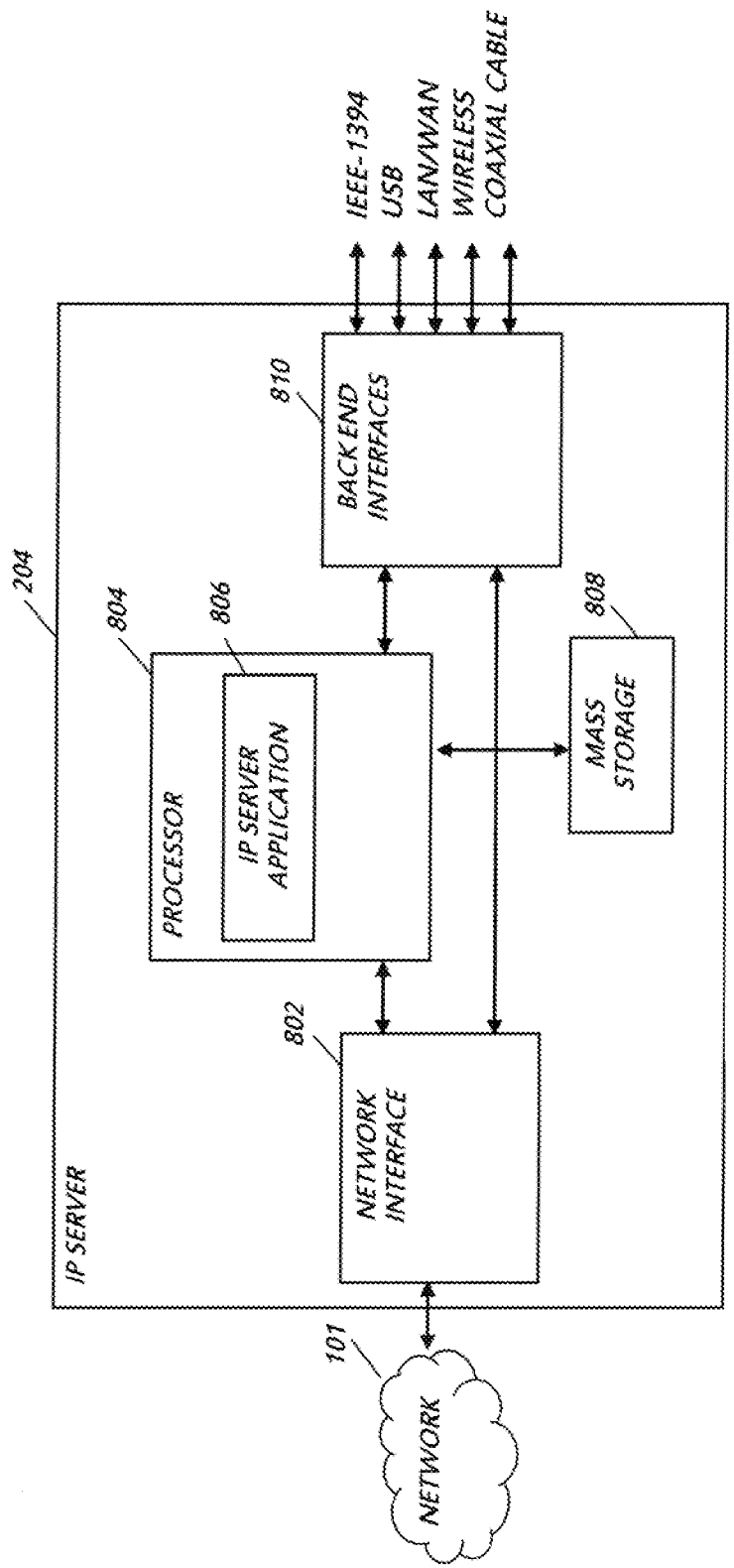
FIG. 8 is a functional block diagram illustrating one embodiment of an IP server device for use in delivering IP packetized content to a subscriber according to the present invention.

FIG. 8 illustrates an exemplary embodiment of a headed IP proxy server 206. As shown, the server generally comprises a network interface 802, a processor 804 running at least an IP server application 806, mass storage 808, and back end interfaces 810.

The network interface 802 enables communication between the IP proxy server 206 and other devices of the network 101. For example the IP server 206 may communicate requests for content to the SDV server or resource manager 196 via the network interface 802. In one embodiment, the IP server 206 (via the IP server application 806)

performs one or more of the functions of the gateway device 204 discussed above. For example, the IP server 206 may format request messages received from the IP CPE 107 for transmission to the SDV server 196.

As noted above with respect to the gateway device 204, storage is necessary at the IP server 206 (when used) for caching information regarding the CPE 107, and regarding the available programs (including EPG information, source ID information and a mini-carousel for SDV content), or alternatively this information can be maintained at the "thinner" gateway previously described.

It is further noted that the headend IP proxy server 206 may further comprise or be associated with a storage entity which acts as a network digital video recorder (nDVR) for the CPE 107. In one embodiment, the network DVR may be of the type discussed in co-owned, co-pending U.S. patent application Ser. No. 11/440,490 entitled "PERSONAL CONTENT SERVER APPARATUS AND METHODS" and filed on May 24, 2006, which is incorporated herein by reference in its entirety. As discussed therein, programming or other content may be delivered to a subscriber over the content distribution network can be accessed via other (secondary) networks such as the Internet, LANs/WANs/MANs, a wireless service provider (WSP) network, cellular service provider (CSP) network, or even a satellite network. The mobile or other devices can be fitted with, e.g., a client or distributed portion of a resource manager application, the former and latter communicating with one another over an interposed network (e.g., Internet) in order to facilitate the routing of content to the remote device.

Exemplary User Device—

Figure 9A:
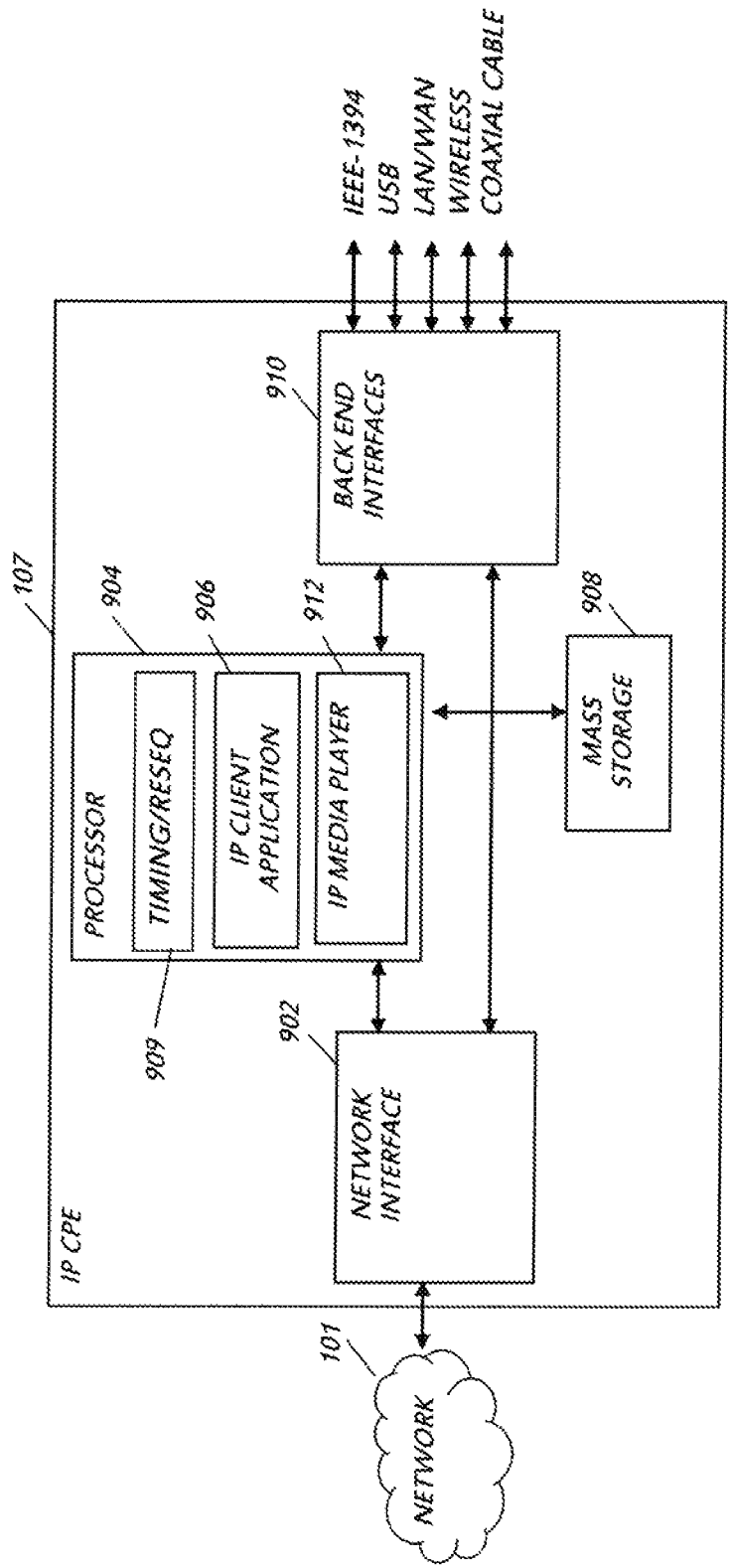
FIG. 9a is a functional block diagram illustrating a first embodiment of an IP enabled CPE according to the present invention.

An exemplary IP capable user device (or CPE) 107 useful with the present invention is illustrated in FIG. 9a. As shown, the IP CPE 107 generally includes e.g., a network interface 902, a processor 904 and associated storage 908, and optionally a plurality of back end interfaces 910 for communication with other devices.

The network interface 902 enables communication between the IP CPE 107 and the network 101 (and/or IP headend server 206 as applicable). One or more of the backend interfaces 910 are used for communication with the gateway, depending on the configuration of the interface on the latter. Since the content being passed between the two devices is IP encapsulated, and only relatively low overhead communications between the IP CPE 107 and the gateway 204 are needed to support the functionality described herein, the interface between the two devices can literally assume any form, including wired and wireless. The front end interface 902 can even be configured to communicate with the gateway if desired (not shown).

To facilitate communication, a messaging link is established between each IP CPE 107 and the gateway 204 (and/or IP proxy server 206). The messaging link, in one embodiment, does not require two-way communications via the CMTS to the SDV server/resource manager The IP CPE 107 may access currently streaming video without a two-way connection. This functionality produces, inter alfa, very low non-responder impact in SDV systems (i.e., when the HFC network experiences a noisy or inoperative upstream path, legacy TV broadcast viewing is not impacted; this feature enables a like method of forward-only network TV viewing in the gateway-IP CPE configuration).

A processor 904 running on the IP CPE 107 is configured to load and run a media player, such as Microsoft Silverlight®. The media player implements digital rights management (DRM) and requires the appropriate corresponding headend DRM functionality.

The processor 904 is also configured to implement the previously disclosed TA protocol. This may be done a number of ways, such as via customization of the media player, a loadable driver, integration with a web-based and/or HTML IPG, etc.

The processor 904 also includes logic 909 for the restoration of received IP packet timing and sequence, such as via reading of the embedded PCR (program clock reference) data and packet sequence numbers.

The IP CPE 107 obtains and caches a numbered list of channels from the channel list server 202 (FIG. 2a). This list is already available, and in one embodiment, is delivered to the IP CPE 107 over a DOCISIS connection (via the gateway device 204). The IP CPE 107 does not need any information about how the channels are carried; rather it is the gateway modem 708 which makes that determination. The channel list is, in one embodiment, advantageously configured so that even if guide data was corrupt or incomplete, tuning may still be performed using just a channel number. The program guide or channel list interfaces with the media player and the TA protocol to perform channel change requests and housekeeping functions. In one embodiment, the channel list comprises a short-descriptor based channel list for mapping of stream requests.

When the IP CPE 107 is booted up, an initialization sequence is executed between the CPE 107 and gateway 204 (and/or headend IP proxy server 206 if present). During initialization, the gateway 204 (or IP proxy server 206) is provided with a short capabilities table relating to the IP CPE 107.

As indicated above, the gateway 204 has an identical channel list to that of the IP CPE 107. However, the gateway 204 has additional information regarding the available channels, including e.g., information regarding channels available via broadcast versus switched (using SDV), format information, etc.

The backend interface(s) further enables the IP CPE 107 to receive requested content. The IP CPE 107, via functionality running at the processor 904 buffers and re-synchronizes received packets. The IP CPE 107 is further configured to decode MPEG-2 "clear" streams as discussed above.

The IP CPE 107 may request content that it or the user is not authorized to view. However, in this instance, DRM functionality running at the CPE 107 prohibits the decryption of the stream, so the customer could not view the unauthorized content. Thus, the IP CPE 107 must run a DRM-capable media player. In one embodiment, when this occurs, the media player may be configured to display a message to the user, so as to give the user information on how to obtain access to the requested content. For example, the message may indicate "please call us at 1-800-PAY-CASH to view this channel".

In one embodiment, the IP CPE 107 implements a TA or substantially similar protocol of the type previously described herein, and may be downloaded to the IP CPE 107 via the network 101.

In another embodiment, the additional restrictions (if any) to the provision of content to a user at a display or rendering device associated with the user device are determined by the device (e.g., IP CPE 107, etc.) itself, as discussed in co-owned, co-pending U.S. patent application Ser. No. 12/716, 131 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber, and/or what restrictions or privileges to apply. Hence, in the present context, the MSO might generate a rights profile and pass this profile (or information indicating which of a plurality of pre-positioned profiles to apply) to the gateway device 204 for transmission to the smart media player on the client device 107.

In yet another embodiment, the IP CPE 107 further comprises a hard drive in communication therewith or integrated therein which acts as a digital video recorder (DVR).

Figure 9B:
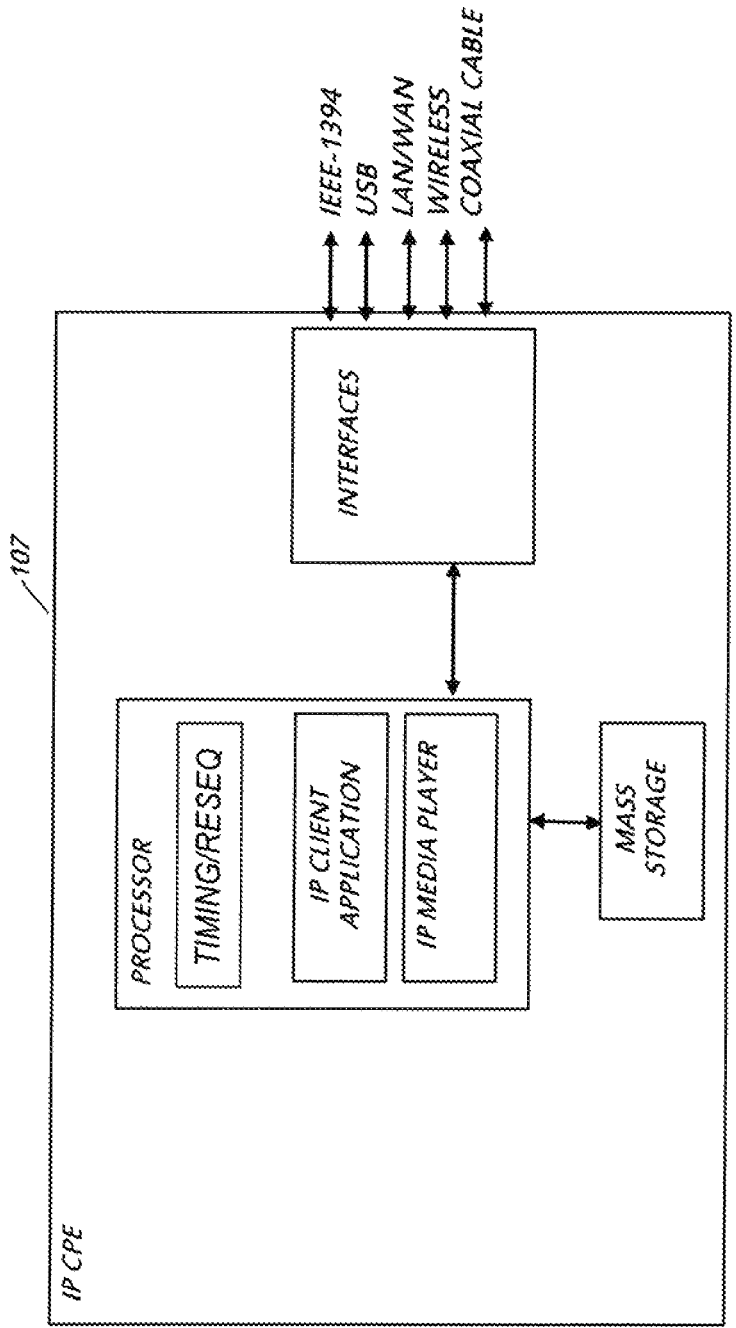
FIG. 9b is a functional block diagram illustrating a second embodiment of an IP enabled CPE according to the present invention.

FIG. 9b illustrates an alternative embodiment of the CPE 107 according to the invention. In this embodiment, the IP-enabled CPE has no "front end" network interface (e.g., tuner, demodulator, etc.), but merely communicates via one or more of its WLAN, USB, etc. interfaces of the type well known in the art. It relies solely on the gateway to tune, demodulate, etc. the signals, along with protocol translation. Hence, the device of FIG. 9b can assume literally any form factor, including e.g., portable wireless devices such as smartphones, laptop computers, personal media devices, etc., and operates largely just as any other IP-enabled device would operate (with the exception of the messaging support needed for content requests, etc.).

Video on Demand (VOD) Content Delivery—

The aforementioned TA/TR or similar protocol implemented by the gateway device 204, IP proxy server 206 and/or IP-enabled CPE 107 may be further extended to include VOD messaging. In one embodiment, the VOD-over-TA approach is utilized, and offers inter alia the regulatory advantage of physical (by spectrum allocation) separation between contention-based CMTS data/voice delivery and the operator-controlled video delivery. Such an extension to the TA protocol may be configured to integrate closely with the program guide provided to the user devices (see discussion above), in order to take advantage of present mechanisms for linking VOD protocol to the guide.

In one exemplary embodiment, VOD content may be provided to an IP CPE device as IP content using similar mechanisms to those discussed above. That is to say, the gateway 204 (or headend IP server 206) may simply perform demultiplexing and encapsulation on the requested content prior to its delivery to the IP CPE 107. In one variant, the bandwidth optimization mechanism of the aforementioned SDV system is not utilized to provide such VOD streams. However, in another variant, a common resource manager (such as the global session resource manager or GSRM) is used, and the VoD unicast streams are intermixed such as to yield some of the bandwidth savings (although obviously not the multicast savings).

As unicast viewing increases, the carriage of VOD through the CMTS 199 may produce a shift IP video content over to the CMTS 199 as well, thereby necessitating expansion thereof. However, for the provision of VOD according to the exemplary embodiments discussed above, the CMTS 199 changes are limited to IPTV VOD additions only (it is presumed that there is no need to expand the CMTS 199 for simulcast carriage).

Note that any stream can feasibly be "handed off" to a VoD subsystem, but that subsystem will set up the unicast stream on its own edge QAM bandwidth resource, which may or may not be on the same physical (QAM) device (or even multiplexed into the same MPTS) shared with the SDV system. The gateway 204 in one configuration of the invention performs the VoD function under direction of the IP-enabled CPE 107 via a CPE-to-gateway transactional exchange, but the streams themselves are not included in the SDV pool (although they could stream from the same physical QAM or even the same MPTS via e.g., GSRM control, but are unicast).

As an alternative method of using the gateway 204 for unicast transactional traffic, unicast transactional traffic payload may be streamed through the CMTS and the QAM resources under its control.

Business/Operational Rules Engine—

In another aspect of the invention, a so-called "decision" engine may be disposed at e.g., the, the gateway device 204, the IP CPE 107, the SDV server 196, headend IP server 206, or other location (e.g., rendered as one or more computer programs disposed thereon). This engine comprises, in an exemplary embodiment, one or more software routines adapted to control the delivery of IP content over the SDV architecture in order to achieve one or more goals relating to operations or business (e.g., profit or revenue or subscriber retention). Included within these areas are network optimization and reliability goals, increased maintenance intervals, increased subscriber or user satisfaction/longevity, increased subscription base, higher profit (e.g., from increased advertising revenues, more subscriber "views" of given content, greater flexibility in the types and locations of platforms from which the subscriber may access content, and so forth).

These decision rules may comprise a separate entity or process, and may also be fully integrated within other processing entities (such as the applications running on the aforementioned entities and/or the client application), and controlled via e.g., a GUI displayed on a device connected to the relevant server, network entity, or even CPE 107. In effect, the rules engine comprises a supervisory entity which monitors and selectively controls content access and delivery operation at a higher level, so as to implement desired operational or business rules. The decision engine can be considered an overlay of sorts to the more fundamental algorithms used to accomplish required network operation.

For example, the relevant entity may invoke certain operational protocols or decision processes based on information or requests received from the legacy CPE 106 or IP-enabled CPE 107, conditions existing within the network, demographic data, geographic data, etc. However, these processes may not always be compatible with higher-level business or operational goals, such as maximizing profit or system reliability. Hence, when imposed, the business/operational rules can be used to dynamically (or manually) control access to and delivery of content (and/or associated advertising or promotions). The decision rules may be, e.g., operational or business-oriented in nature, and may also be applied selectively in terms of time of day, duration, specific local areas, or even at the individual user level (e.g., via specific identification of the CPE 106, 107 or client device via a tuner identity (tuner ID), IP address, MAC address, or the like, or via a user-based login or "entitlements" profile of the type described at e.g., co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", which is incorporated herein by reference in its entirety.

For example, one decision rule implemented by the decision engine may comprise providing IP packetized content via the SDV server 196 according to a revenue- or profit-driven system. Utilizing this approach, content may be selected in part on the revenue or profit such delivery will bring to the MSO based on the content source. For example, certain content which brings more revenue to the MSO may be selected for delivery over other, less profitable content, especially in cases where bandwidth or other resource contention might exist. In another variant, the use rights or features provided with the requested (protected) content may be varied as a function of e.g., subscriber subscription level, time of day, requesting device capability, etc. For instance, a request received from a premium level, or "Gold", subscriber might be serviced with an IP content stream that includes complete "trick mode" functionality (i.e., FF, REW, Pause, etc.), whereas a lower tier subscriber's request might not include these capabilities. This might be controlled, for example using the aforementioned control by the GSRM. The number of plays can be limited as well; e.g., Gold subscribers receive unlimited plays of the IP content, while lower tiers receive only one or a finite number of plays of the content.

Moreover, the quality of content provided or quality of delivery can be varied as needed or desired. For instance, use of different encodings (e.g., H.264 versus MPEG-2), QoS parameters, latency, etc. can be employed depending on the subscriber (individually), the general classification of the subscriber (e.g., Gold), time of day, available resources, revenue/profit implications of each option, etc.

The content sources may also utilize a business relationship whereby they "pay" the MSO for providing content as both MPEG-2 and MPEG-4 content. For example, a content source, such as CNN, might pay the MSO $X for each valid subscriber request serviced by the MSO, because the content source is in effect leveraging the MSG's infrastructure to extend the reach of its capabilities for the MSO customers.

In another aspect of the invention, the relative ease under which multiple different (and incompatible) encryption types may be offered can be leveraged to the network operator's advantage. Specifically, in one implementation, a given content element (e.g., program) could be provided in numerous encryption formats (e.g., different types of DRM, PowerKey, etc.), and this would be transparent to the SDV server/resource manager, router, QAM modulator, and gateway. Only the CPE 107 and the source encryptor need to be aware of the encryption format. The CPE requests a source ID (or a number that the gateway maps to a source ID), and the gateway 204 advantageously does not need to have any knowledge of what the encryption format is. This approach can be used to automatically minimize the bandwidth penalty of such intermixing of encryption formats to the point where the impact on network bandwidth demand of any one encryption scheme is insignificant. This ostensibly frees of the network operator from substantially "monopolistic" practices by encryption technology providers and intellectual property holders, and make the industry more competitive in that no particular encryption scheme is favored.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a content distribution network to deliver both Internet Protocol (IP) encoded content data and non-IP encoded content data via a digital content delivery system, the method comprising:
   causing, via a computerized network entity, delivery in a first transport stream of non-IP encoded digital content accessible by at least one non-IP enabled device destination; and
   causing, via the computerized network entity, concurrent delivery in the first transport stream of IP-encoded digital content data associated with at least one IP enabled device destination, each of the at least one non-IP enabled device destination and the at least one IP enabled device destination associated with a first service group of the content distribution network;
   wherein a scheduling or allocation of the non-IP encoded digital content and the IP-encoded digital content within the first transport stream is performed without regard to IP encoding.

2. The method of claim 1, wherein the scheduling or allocation without regard to IP encoding obviates network-layer analysis in delivery of the first transport stream.

3. The method of claim 1, wherein the scheduling or allocation without regard to IP encoding enables unrestricted selection of one or more existing quadrature amplitude modulation (QAM) radio frequency (RF) channels for the delivery of the non-IP encoded digital content and the concurrent delivery of the IP encoded digital content.

4. The method of claim 1, further comprising assigning at least a first QAM channel and a second QAM channel to each carry at least a respective portion of the first transport stream;
   wherein the assigning of the at least first QAM channel and the at least second QAM channel comprises assigning at least two spectrally non-contiguous radio frequency (RF) channels.

5. The method of claim 1, wherein:
   the causing delivery of the non-IP encoded digital content comprises causing delivery at a first bitrate; and
   the causing concurrent delivery of the IP encoded digital content comprises causing delivery at a second bitrate, the second bitrate lower than the first bitrate.

6. The method of claim 1, wherein:
   the causing delivery of the non-IP encoded digital content comprises causing delivery at a first level of quality of service (QoS); and
   the causing concurrent delivery of the IP encoded digital content comprises causing delivery at a second level of QoS, the second level of QoS lower than the first level of QoS.

7. The method of claim 1, wherein:
   the causing delivery of the non-IP encoded digital content comprises causing delivery of MPEG-2 encoded content; and the causing concurrent delivery of the IP encoded digital content comprises causing delivery of MPEG-4 or H.264 encoded content, the MPEG-4 or H.264 encoded content having a bitrate approximately one-half of a bitrate associated with the MPEG-2 encoded content.

8. The method of claim 1, wherein the causing concurrent delivery in the first transport stream of the IP encoded digital content comprises causing delivery of the IP encoded digital content without one or more of: (i) data-over-cable service interface specifications (DOCSIS) framing, and/or (i) IP headers.

9. The method of claim 1, wherein the computerized network entity comprises an edge node, the edge node comprising at least a switched digital node configured to selectively switch-in and switch-out individual ones of a plurality digital content based respectively at least on a presence or an absence of a request therefor from one or more of a plurality of user devices.

10. A server apparatus configured for operation within a switching system of a content delivery network, the server apparatus comprising:
at least one data communication interface configured for data communication with the content delivery network;
processor apparatus in data communication with the at least one data communication interface; and
at least one storage device in data communication with the processor apparatus, the at least one storage device configured to store at least one computer program thereon, the at least one computer program comprising a plurality of instructions which are configured to, when executed by the processor apparatus, cause the server apparatus to:
in a first data stream within a multi-program transport stream (MPTS), cause delivery of legacy content to at least a first user device; and
switch-in at least one additional data stream into the MPTS to cause simultaneous delivery of packetized content to at least a second user device, the at least second user device in a same service group as the at least first user device, the packetized content encapsulated using at least a network layer protocol;
wherein the at least one computer program comprises logic enabling the switch-in of the at least one additional data stream into the MPTS irrespective of the presence of the network layer protocol encapsulation of the packetized content.

11. The server apparatus of claim 10, wherein the legacy content comprises MPEG-2 encapsulated content, and the packetized content comprises Internet Protocol (IP) encapsulated content.

12. The server apparatus of claim 10, wherein the switch-in of the at least one additional data stream irrespective of the presence of the network layer protocol encapsulation of the packetized content enables free intermix and obviates network-layer analysis in delivery of the MPTS.

13. The server apparatus of claim 12, wherein the enablement of free intermix comprises enablement of unrestricted selection of one or more existing quadrature amplitude modulation (QAM) channels for the delivery of the legacy content and the simultaneous delivery of the packetized content.

14. The server apparatus of claim 13, wherein the enablement of selection of the one or more existing QAM channels comprises enablement of randomized selection of the one or more existing QAM channels.

15. The server apparatus of claim 13, wherein the plurality of instructions are further configured to, when executed by the processor apparatus, cause the server apparatus to assign at least a first QAM channel and a second QAM channel to each carry at least a respective portion of the MPTS;
wherein the assignment of the at least first QAM channel and the second QAM channel comprises assignment of at least two spectrally non-contiguous radio frequency (RF) channels.

16. The server apparatus of claim 10, wherein the at least one computer program further comprises logic enabling the switch-in of the at least one additional stream into the MPTS irrespective of a proportion of the packetized content relative to the legacy content within the MPTS.

17. The server apparatus of claim 10, wherein the first user device comprises a non-IP enabled user device, and the second user device comprises an IP enabled user device; and
the legacy content comprises MPEG-2 encoded content compatible with the non-IP enabled user device, and the packetized content comprises MPEG-4 or H.264 encoded content compatible with the IP enabled user device.

18. A server apparatus configured for operation within a content delivery network, the server apparatus comprising:
at least one data communication interface configured for data communication with the content delivery network;
processor apparatus in data communication with the at least one data communication interface; and
at least one storage device in data communication with the processor apparatus, the at least one storage device configured to store at least one computer program thereon, the at least one computer program comprising a plurality of instructions which are configured to, when executed by the processor apparatus, cause the server apparatus to:
identify data indicative of a first request for internet protocol (IP) content from a first user device and data indicative of a second request for non-IP content from a second user device, the first user device and the second user device associated with a first service group of the content delivery network; and
based at least in part on the identification of the data indicative of the first request and data indicative of the second request, select one or more existing quadrature amplitude modulation (QAM) radio frequency (RF) channels to enable (i) delivery of the IP digital content, and (ii) simultaneous delivery of the non-IP digital content within a first transport stream;
wherein the selection comprises unrestricted selection of the one or more existing QAM RF channels agnostic to an IP encoding of the IP digital content and a non-IP encoding of the non-IP digital content.

19. The server apparatus of claim 18, wherein the unrestricted selection of the one or more existing QAM RF channels at least in part comprises randomized identification of one or more available portions of an RF spectrum.

20. The server apparatus of claim 18, wherein the unrestricted selection is further agnostic to a proportion of the IP content relative to the non-IP content within the first transport stream.

* * * * *